(12) United States Patent
Minagawa

(10) Patent No.: US 6,483,855 B1
(45) Date of Patent: Nov. 19, 2002

(54) COMMUNICATION CONTENT RECORDING APPARATUS AND METHOD

(75) Inventor: Tetsuo Minagawa, Kanagawa (JP)

(73) Assignee: Denon, Ltd., Tokyo (JP)

( * ) Notice: Subject to any disclaimer, the term of this patent is extended or adjusted under 35 U.S.C. 154(b) by 0 days.

(21) Appl. No.: 09/136,735

(22) Filed: Aug. 19, 1998

(30) Foreign Application Priority Data

| Aug. 28, 1997 | (JP) | ................................................ 9-247784 |
| Aug. 28, 1997 | (JP) | ................................................ 9-247785 |
| May 28, 1998 | (JP) | ........................................... 10-164122 |

(51) Int. Cl.$^7$ ................................................ H04J 1/02
(52) U.S. Cl. ............................................ 370/493; 386/14
(58) Field of Search .................................. 370/474, 373, 370/420, 437, 439, 465, 522, 524, 264, 355, 357, 359, 360, 400, 438, 468, 493, 494, 496; 386/14, 21, 26, 29, 33, 34, 36, 40, 51, 57, 66, 79, 80, 113

(56) References Cited

U.S. PATENT DOCUMENTS

| 5,446,731 A | * 8/1995 | Lee ............................ 370/377 |
| 5,521,963 A | * 5/1996 | Shrader et al. .............. 445/437 |
| 5,535,262 A | 7/1996 | Kanzawa |

FOREIGN PATENT DOCUMENTS

| FR | 2 712 131 | 5/1995 |
| JP | 03-092036 | 9/1989 |
| JP | 03235458 | 10/1991 |
| JP | 05-183644 | 7/1993 |
| JP | 05-234247 | 10/1993 |
| JP | 05-143174 | 6/1995 |
| JP | 7-143174 A | 6/1995 |
| JP | 09-200290 | 7/1997 |

OTHER PUBLICATIONS

Manipulation Ausgeschlossen, Telcom Report, Siemens AG. Munchen, DE., vol. 19, No. 2, 1996, pp. 32–33.

* cited by examiner

Primary Examiner—Douglas Olms
Assistant Examiner—Phirin Sam
(74) Attorney, Agent, or Firm—Dickstein Shapiro Morin & Oshinsky LLP

(57) ABSTRACT

A communication content recording apparatus supporting a digital communication such as ISDN is provided. A communication content recording apparatus includes receivers for receiving data transmitted/received between communication terminal units through ISDN, protocol processors for processing a frame on a signal channel received by the receiver according to a protocol, an information channel processor for converting the data on the information channel received by the receivers to data whose format is compatible with being recorded in a recording medium, and a protocol controller for controlling start and stop of the processing of the information channel processor according to messages which are obtained on the basis of a processing result in the protocol processors.

17 Claims, 14 Drawing Sheets

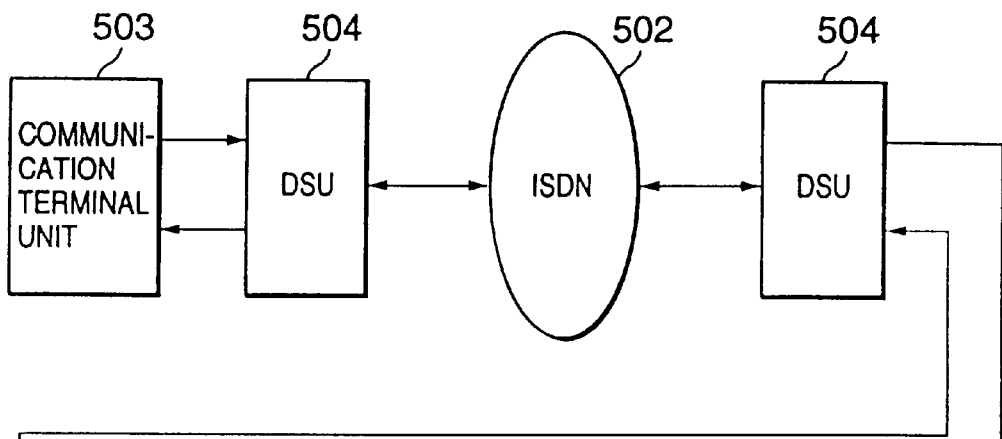
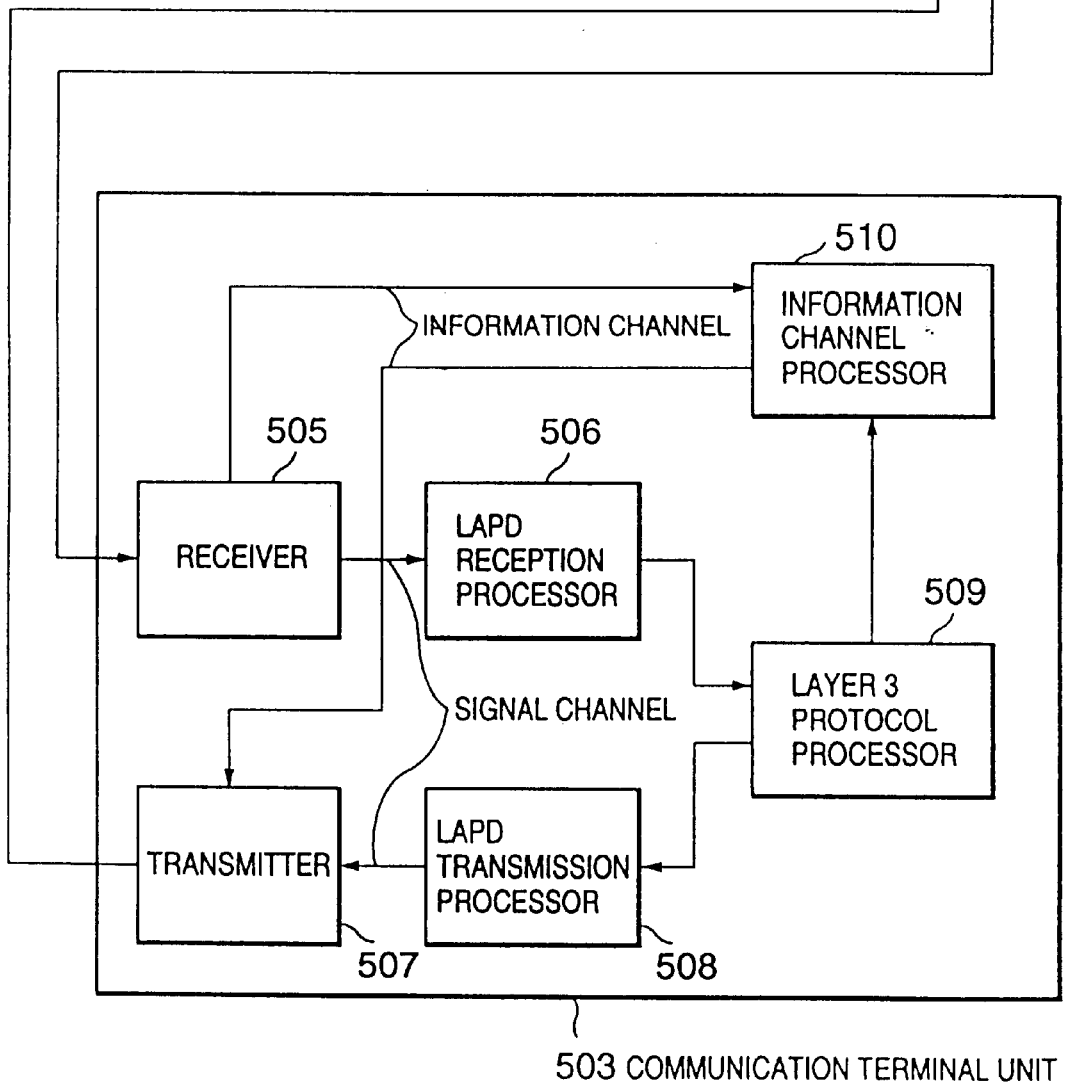
FIG.12 (PRIOR ART)

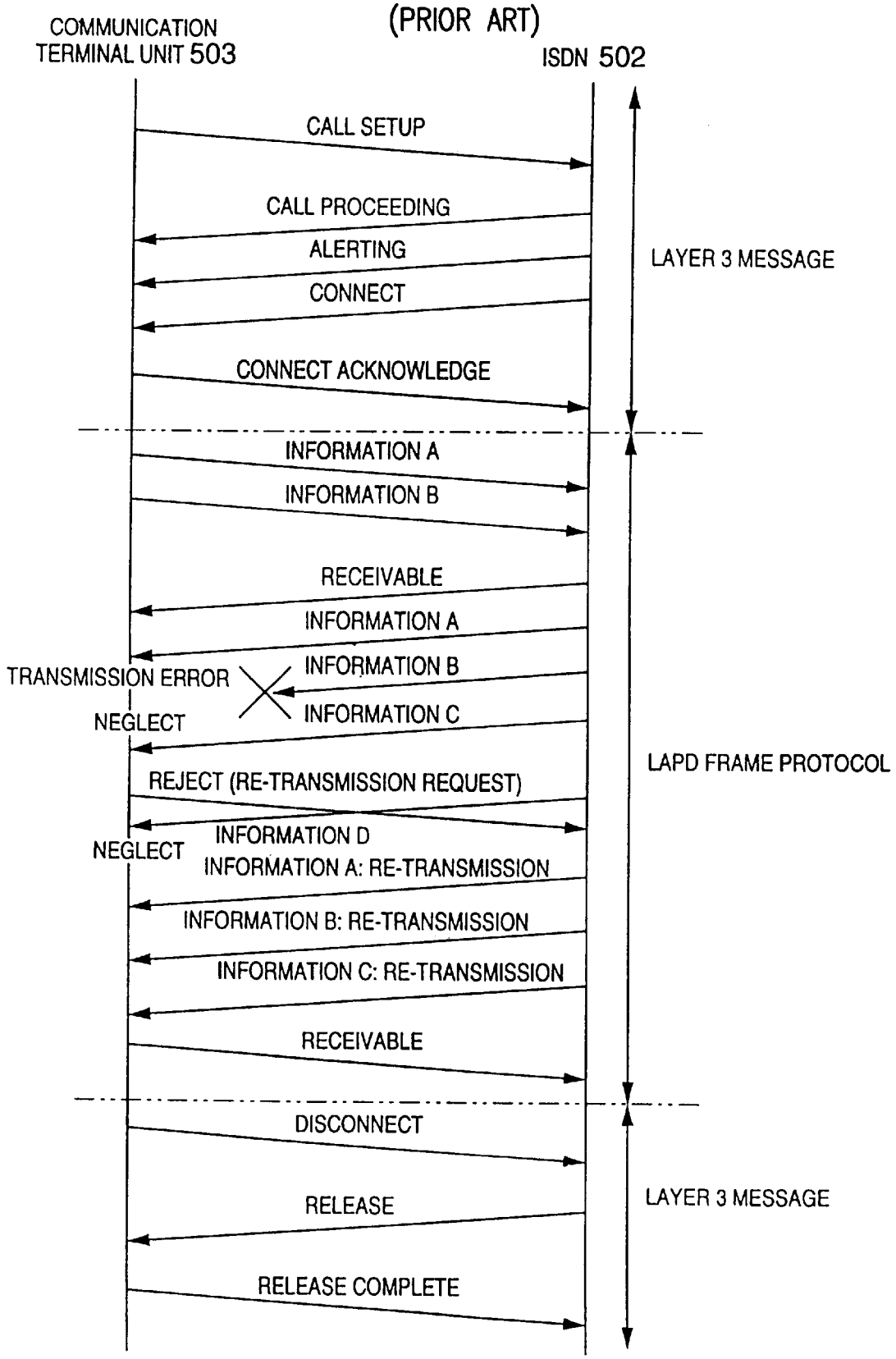

COMMUNICATION CONTENT RECORDING APPARATUS AND METHOD

BACKGROUND OF THE INVENTION

1. Field of the Invention

The present invention relates to communication content recording apparatus and method of recording communication contents such as speech data, etc. to be transmitted through a communication line.

2. Description of Related Art

Various dealings using telephone lines have been made in financial institutions such as banks, securities, etc., telephone marketing such as telephone-ordering and public undertakings such as horse racing, etc. In such a case, communication contents are usually required to be recorded in order to check them again or leave them as evidence. Therefore, communication content recording apparatuses for recording communication contents without affecting the persons using the telephonic communications have been hitherto utilized.

In this type of communication content recording apparatuses, the start and stop timings of a communication recording operation are controlled by surveying the signal level on a telephone line or surveying the off-hook/on-hook operation in order to record communication contents without affecting the operations of existing communication systems as in the case of DN-08R and DN-09R models produced by Nippon Columbia Co., Ltd., or Japanese Laid-open Patent Application No. Hei-5-234247.

Recent developments in digital technologies have promoted propagation of ISDN (Integrated Services Digital Network) as a communication network in which various different services such as telephonic communication services, data communication services, etc. can be connected by using the same digital exchanger and digital bus. ISDN transmits information while digitizing the information, and thus ISDN can perform higher-speed communications with less signal deterioration than analog lines. Here, ISDN will be briefly described.

ISDN has a signal channel (D channel) for transmitting control information such as call control information, etc. and an information channel (B channel) for transmitting user information. Two types of interface are provided as interfaces of ISDN. One is a basic interface (BRI: Basic Rate Interface) comprising one D channel and two B channels, and the other is a primary rate interface (PRI) comprising plural B channels and a D channel.

In a user/network interface (I interface) of ISDN, layer 1 to layer 3 are defined for the connection condition between a communication terminal unit and ISDN. The layer 1 to layer 3 are compliant with a 7-layer model serving as a basic reference model of Open System Interconnection (OSI) defined by ISO (International Standardization Organization), and based on basic layers of a physical layer, a data link layer and a network layer which are associated with control of communication networks, thereby enabling communications among various communication equipment.

The layer 1 is applied to an information channel and a signal channel, and an electrical/physical condition to connect a communication terminal unit to a digital line terminal unit (DSU: Digital Service Unit) is defined in the layer 1. In the layer 1 are specifically defined a wiring construction, a frame structure, a transmission path code, signal channel access control, frame synchronization, electrical characteristics, power supply conditions, etc.

In the layer 2, information transmission management for implementing transmission of information to be transmitted/received through a signal channel between a communication terminal unit and ISDN is defined. This is called LAPD (Link Access Procedure on the D-channel). By establishing the link between the communication terminal unit and ISDN in the layer 2, "call" of the information channel can be established on the layer 3 as described later. Specifically, a frame format, a frame type, an information transmission procedure, a management procedure of a terminal endpoint identifier (TEI), etc. are defined. In the frame format, there are provided an information frame for carrying out information transmission in the layer 3, a surveying frame for checking transmission/reception of the information frame and making a re-transmission request, and an unnumbered frame.

FIG. 11 is a diagram showing the structure of an LAPD frame in ISDN. As shown in FIG. 11, a frame based on the LAPD protocol contains an address portion, a control portion (containing sequence number), an information portion and a frame check sequence portion for detecting an error, which are sandwiched between flags (0111110).

In the layer 3, information on an information channel, which is transmitted between communication terminal units after the link is established in the layer 2, is defined. Specifically, the content of the information format, the control of a line switching connection, a packet communication procedure, etc. are defined. The line connection and the link between ISDN (network) and each of communication terminal units are established by the layers 1 and 2, and "call" between communication terminal units through ISDN is established by the layer 3.

In the layer 3, messages indicating call control, etc. are transmitted on the basis of the information frame. As messages indicating the call control, there are provided a call-setup message, a call proceeding (call-setup reception) message, an alerting message, a connect message and a connect acknowledge message, which are to establish a call, and disconnect, release and release complete messages, which are to release the call.

Next, the frame format used in ISDN will be described.

A transmission sequence number and a reception sequence number are affixed to an information frame. Each of these sequence numbers is incremented one by one when transmitted or received. Each of the transmission and reception sequence numbers is modulo (mod) 128 in which numerical values of 0 to 127 are repeatedly used (for example, 0, 1, 2, . . . 126, 127, 0, 1, 2, . . . ). For example, an information frame which is first transmitted is allotted with a transmission sequence number "0", and an information frame which is secondly transmitted is allotted a transmission sequence number "1". At this time, if the reception side has not yet received any information frame, the reception sequence number of an information frame transmitted by the reception side is equal to "0". If the reception side receives an information frame, the reception sequence number of an information frame transmitted by the reception side is equal to "1".

As the surveying frame, there are provided a reception ready (RR) frame for notifying the transmission sequence number of a frame to be next received (the number of frames which have been received) to a communication partner with which communications are being made when no information frames have been generated for a predetermined time period, and a reject (REJ) frame for detecting, on the basis of the transmission sequence number of the frame thus received, a frame which could not be received due to a transmission error, and requesting re-transmission of the missing frame. Like the information frame, a reception sequence number is also affixed to the surveying frame. In the case of the RR frame, it represents the transmission sequence number of a frame to be next received (the number of frames which have been received), and in the case of the REJ frame, it represents the transmission sequence number of a frame which could not be received due to a transmission error.

As the unnumbered frame, there are provided a set asynchronous balanced mode extended (SABME) frame, an unnumbered information (UI) frame, a disconnect (DISC) frame, an unnumbered acknowledgment (UA) frame, etc.

Next, a conventional communication system using ISDN will be described.

FIG. 12 is a schematic diagram showing a conventional communication system using ISDN.

As shown in FIG. 12, a communication terminal unit 503 is connected to ISDN 502 through DSU 504. DSU 504 performs a control operation to physically connect the communication terminal unit 503 and ISDN 502. The communication terminal unit 503 includes a receiver 505, an LAPD reception processor 506, a transmitter 507, an LAPD transmission processor 508, a layer 3 protocol processor 509 and an information channel processor 510 for processing data on the information channel.

The receiver 505 receives information (data) transmitted through DSU 504 from ISDN 502. It outputs the data on the signal channel to the LAPD reception processor 506 and also outputs the data on the information channel to the information channel processor 510.

The LAPD reception processor 506 obtains a frame format, a frame type, information transmission procedure, etc. from the LAPD frame on the signal channel to manage information received/transmitted through the signal channel.

The LAPD reception processor 506 performs error detection on the basis of a frame check sequence portion of an LAPD frame, and also surveys continuity of transmission sequence numbers of LAPD frames received to thereby perform defect detection of the LAPD frames. When an error is detected or an LAPD frame has a defect, the LAPD transmission processor 508 transmits a re-transmission request through the transmitter 507 to ISDN 502.

The layer 3 protocol processor 509 surveys the communication status between the communication terminal unit 503 thereof and ISDN 502 to control communications with ISDN 502 on the basis of messages such as call-establishment, call-release, etc. For example, when information is transmitted to a communication partner, the LAPD transmission processor 508 and the transmitter 507 are controlled so that control information is generated and transmitted together with information generated in the information channel processor 510.

In the conventional communication system using ISDN thus constructed, messages are communicated on the signal channel between the communication terminal unit 503 and ISDN 502 to perform establishment or release of call of an information channel or selection of an information channel. When an error is detected in the communication of a message, the system is restored from the error by re-transmitting the message.

FIG. 13 is a flowchart showing the processing in the above conventional communication system using ISDN when a communication terminal unit receives an error frame.

When an error occurs in the data transmission from ISDN 502 to the communication terminal unit 503 or from the communication terminal unit 503 to ISDN 502 in FIG. 12, the processing is carried out according to the flow shown in FIG. 13.

In a case of the signal channel for performing the data transmission from ISDN 502 to the communication terminal unit 503, when the receiver 505 receives an LAPD frame (step S701), the LAPD reception processor 506 first judges whether or not the LAPD frame received is an error frame (step S702). If the LAPD frame received is not any error frame, the processing is carried out according to the content of the LAPD frame (step S703).

On the other hand, if the LAPD frame is an error frame, the error frame is discarded (step S704). The LAPD transmission processor 508 transmits a re-transmission request through the transmitter 507 to ISDN 502 (step S705). The LAPD reception processor 506 neglects information which has been received during a time period from the reception of the error frame until the transmission of the re-transmission request. ISDN 502 receiving the re-transmission request re-transmits the information indicated by the re-transmission request as an LAPD frame.

As described above, the LAPD reception processor 506 surveys the continuity of the transmission sequence numbers of the received LAPD frames to detect defectiveness of the LAPD frames. If there is any defect, the LAPD transmission processor 508 transmits a re-transmission request as in the case of the error frame. The same processing is carried out in ISDN 502 in the case of the signal channel for performing the data transmission from the communication terminal unit 503 to ISDN 502.

FIG. 14 shows an example of the processing procedure carried out between the communication terminal unit 503 and ISDN 502 according to the flow of FIG. 13. In this case, the communication terminal unit 503 judges that information B is an error frame, and transmits a re-transmission request message to ISDN 502. The communication terminal unit 503 neglects frames (information pieces C, D) which have been received during the time period from reception of an error frame until reception of a frame (information A) based on the re-transmission request.

Such re-transmission control is defined by ITU-TS Recommendation I.441 (Q.921). Others are disclosed in Japanese Laid-open Patent Application No. Hei-5-183644, Japanese Laid-open Patent Application No. Hei-7-143147, and Japanese Laid-open Patent Application No. Hei-9-200290.

SUMMARY OF THE INVENTION

The conventional communication content recording apparatus records communications which are carried out through analog lines, and it does not support a digital communication in which connection setting is carried out according to a protocol like ISDN as described above. That is, in the conventional communication content recording apparatus in which the start and stop of the communication recording are controlled by surveying the signal level on the line and on-hook/off-hook, it is difficult to control communication data such as speech data, etc. to be reliably recorded in digital communications with which various services such as telephonic communications, data communications, etc. are supplied.

Further, as described above, in communication based on LAPD between communication terminal unit and ISDN, when one communication terminal unit or ISDN receives an error frame, the communication terminal unit or ISDN (which receives the frame concerned) makes a re-transmission request to the communication terminal unit or ISDN so that the frame can be re-transmitted from the communication terminal unit or ISDN.

On the other hand, the communication content recording apparatus is set so that the transmission to ISDN is inhibited to prevent the communication content recording apparatus from affecting concerned parties using the telephonic communications, as described above. That is, in the communication content recording apparatus, only the receiver for receiving communication data such as speech data, etc. from ISDN is provided as an interface of ISDN.

Therefore, there is a possibility that communication will be performed correctly between communication terminal units, but the communication content recording apparatus for recording a communication content between the communication terminal units concerned will receive an error frame for some reason, so that the communication data cannot be correctly recorded when the error frame is a frame indicating the start or end of the recording.

The present invention has been implemented in view of the above situation, and has an object to provide a communication content recording apparatus which can support digital communications such as ISDN, etc.

Further, the present invention has another object to provide a digital-communication-capable communication content recording apparatus which can record communication data correctly even when an error frame is received or a frame is missing.

In order to achieve the above objects, according to a first aspect of the present invention, a communication content recording apparatus for recording the contents of communications which are carried out between communication terminal units through a digital communication network, includes:

receiving means for receiving data on a signal channel and data on an information channel which are received/transmitted between the digital communication network and the communication terminal units;

protocol processing means for extracting frames from the data on the signal channel received by the receiving means according to a protocol and processing the frames;

information channel processing means for processing the data on the information channel received by the receiving means so that the processed data can be recorded; and protocol controlling means for controlling the start and stop of the processing of the information channel processing means on the basis of a processing result of the protocol processing means.

According to the communication content recording apparatus of the first aspect of the present invention, the start/stop operation of the processing for converting the data on the information channel to recordable data is controlled according to the processing result in the protocol processing means for the frame on the signal channel received by the receiving means. With this operation, for example, when the received frame on the signal channel contains a message for call establishment, the processing for converting the data on the information channel to the recordable data can be started, and when it contains a message for call release, the conversion processing concerned can be stopped. Accordingly, in communications through a digital communication network, the communication content can be recorded without affecting concerned parties in communication with each other.

In the first aspect of the present invention, when a processing result of the protocol processing means indicates that the frame received is an error frame, the protocol controlling means may be designed to presume the content of the error frame on the basis of a processing result of the protocol processing means for a frame received immediately before the error frame if the reception means does not receive a next frame within a predetermined time lapse after receiving the error frame, or according to a processing result of the protocol processing means for the next frame. With this operation, the communication content can be normally recorded even when an error frame is received.

For example, when an error frame is received because of occurrence of troubles between communication terminal units in communication, the communication terminal unit at the frame reception side also receives an error frame. Therefore, a re-transmission-request frame is transmitted from the communication terminal unit concerned or the digital communication network to the digital communication network or the communication terminal unit at the frame transmission side. Accordingly, when the frame received subsequent to the error frame is a re-transmission-request frame, the frame which was judged to be the error frame is re-transmitted from the digital communication network or the communication terminal units at the frame transmission side. Therefore, the error frame can be merely discarded.

However, when an error frame is received although the normal communication is performed correctly between the communication terminal units in communication, the re-transmission-request frame is not transmitted from the communication terminal unit or the digital communication network at the frame reception side to the digital communication network or the communication terminal unit at the frame transmission side. Therefore, there may arise such a case that merely discarding the error frame cannot have the communication content be correctly recorded when the error frame contains a message for call establishment or call release.

Therefore, in a case where a processing result of the protocol processing means indicates the error frame, the start/stop of the recording of the communication data can be performed correctly by presuming the content of the error frame from a processing result of the frame received immediately before the error frame at the protocol processing means if the receiving means does not receive a next frame within a predetermined time period after receiving the error frame or the frame which is received subsequently to the error frame by the reception means is not a re-transmission-request frame.

Further, according to a second aspect of the present invention, a communication content recording apparatus for recording the content of communications which are carried out between communication terminal units through a digital communication network, includes:

receiving means for receiving data on a signal channel and data on an information channel which are received/transmitted between the digital communication network and the communication terminal units;

frame processing means for extracting frames from the data on the signal channel received by the receiving means and outputting the extracted frames;

information channel processing means for processing the data on the information channel received by the receiving means so that the processed data are recordable;

protocol controlling means for controlling the start/stop of the processing of the information channel processing means according to a message contained in a frame output from the frame processing means; and frame missing detection means for surveying continuity of frames output from the frame processing means to detect frame missing, wherein the protocol controlling means controls the start/stop of the processing of the information channel processing means for the information channel concerned in accordance with the progress of a call establishment or call release procedure of the information channel when the frame missing is detected by the frame missing detection means.

According to the second aspect of the present invention, the continuity of the frames which are communicated on the signal channel are monitored, and when a frame missing occurs, the start/stop of the processing of the information channel processing means for the information channel is controlled in accordance with the progress of the call establishment or call release of the information channel which is defined in the protocol between the communication terminal unit and the digital communication network. With this operation, even when a frame missing occurs, the start/stop of the recording of the communication content can be performed correctly.

In the second aspect of the present invention, when a frame extracted from the data on the signal channel received by the receiving means is an error frame, the frame processing means may discard the frame concerned without delivering it to the protocol controlling means. With this operation, the treatment of the frame missing and the error frame can be performed according to the same procedure with no discrimination therebetween so that the start/stop of the recording of the communication content can be performed correctly.

BRIEF DESCRIPTION OF THE DRAWINGS

FIG. 12 is a schematic diagram showing a conventional communication system using ISDN;

FIG. 14 is a diagram showing a processing procedure which is carried out between the communication terminal unit 503 and ISDN 502 shown in FIG. 12 according to the flow of FIG. 13.

DETAILED DESCRIPTION OF THE PREFERRED EMBODIMENTS

Preferred embodiments according to the present invention will be described hereunder with reference to the accompanying drawings.

In the following embodiments of the present invention, the description will be given on the assumption that the communication content recording apparatus of the present invention is applied to ISDN.

First, a first embodiment according to the present invention will be described.

Figure 1:
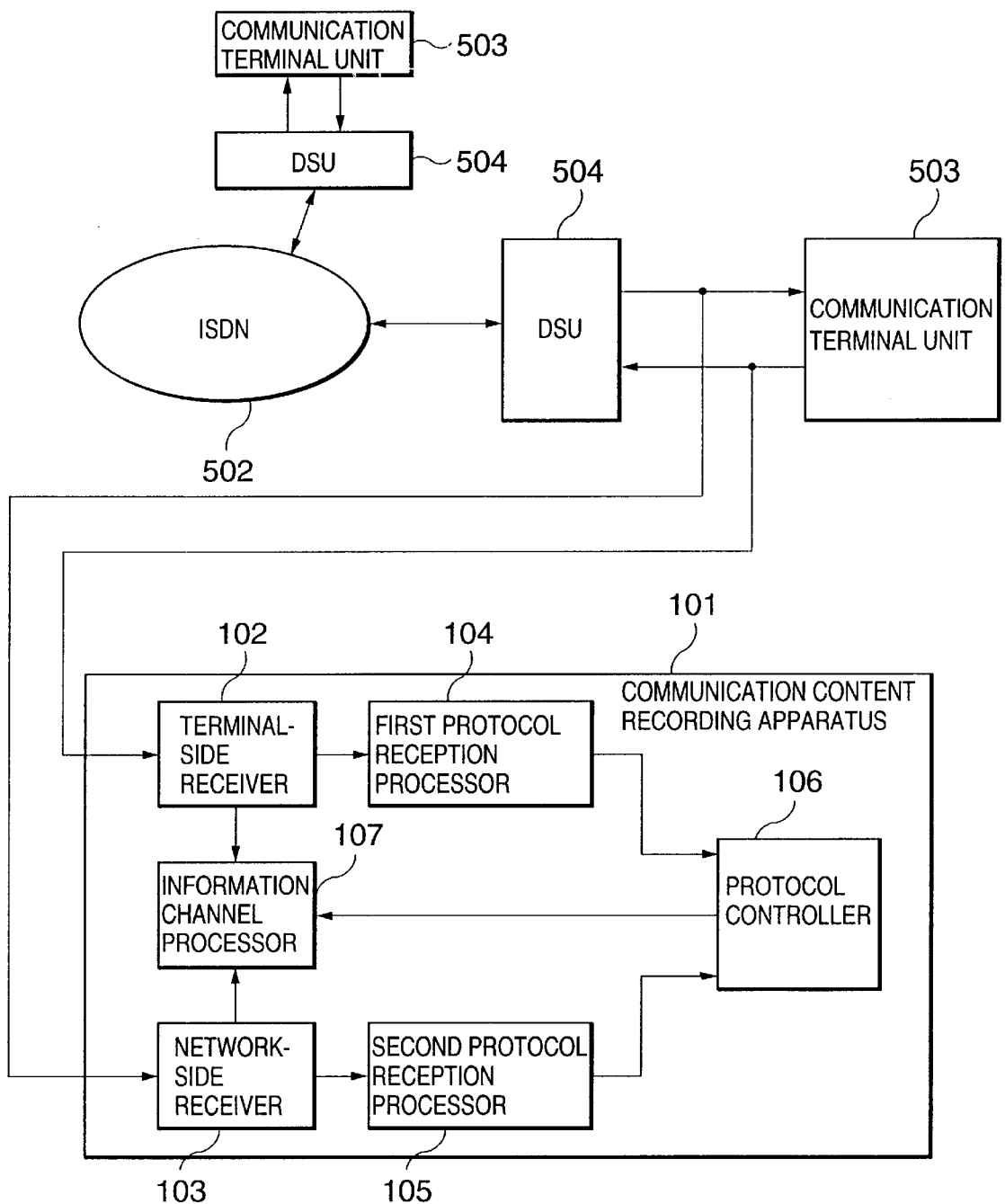
FIG. 1 is a schematic diagram showing a communication system to which a communication content recording apparatus 101 of a first embodiment of the present invention is applied.

FIG. 1 is a schematic diagram showing a communication system to which a communication content recording apparatus of a first embodiment of the present invention is applied. In FIG. 1, the communication terminal unit 503, DSU 504 and ISDN 502 are the same as shown in FIG. 12, and the detailed description thereon is omitted from the following description.

As shown in FIG. 1, the communication content recording apparatus 101 of this embodiment is connected across the communication terminal unit 503 and DSU 504. The communication content recording apparatus 101 has no transmission function, but has only the reception function. It monitors the communication content transmitted from ISDN 502 to the communication terminal unit 503 or the communication content transmitted from the communication terminal unit 503 to ISDN 502 on the basis of data such as a message or the like which is transmitted/received between ISDN 502 and the communication terminal unit 503, and records the communication content thus surveyed into a recording medium.

The communication content recording apparatus 101 includes a terminal-side receiver 102, a network-side receiver 103, a first protocol reception processor 104, a second protocol transmission processor 105, a protocol controller 106 and an information channel processor 107.

The terminal-side receiver 102 receives data on the signal channel and the information channel which are transmitted from the communication terminal unit 503 to ISDN 502, and outputs the data on the signal channel to the first protocol reception processor 104 while outputting the data on the information channel to the information channel processor 107.

The network-side receiver 103 receives data on the signal channel and the information channel which are transmitted from ISDN 502 to the communication terminal unit 503, and outputs the data on the signal channel to the second protocol reception processor 105 while outputting the data on the information channel to the information channel processor 107.

The first protocol reception processor 104 obtains an LAPD frame based on the protocol of LAPD from the data on the signal channel which are obtained through the terminal-side receiver 102 and transmitted from the communication terminal unit 503, and identifies a frame format, a frame type and information transmission procedure thereof on the basis of the LAPD frame thus obtained. Further, it judges whether a message is a message for call establishment or call release on the basis of the identification result, and outputs the content thereof to the protocol controller 106.

The second protocol reception processor 105 obtains an LAPD frame based on the protocol of LAPD from the data on the signal channel which are obtained through the network-side receiver 103 and transmitted from ISDN 502, and identifies a frame format, a frame type and information transmission procedure thereof on the basis of the LAPD frame thus obtained. Further, it judges whether a message is a message for call establishment or call release on the basis of the identification result, and outputs the content thereof to the protocol controller 106.

The protocol controller 106 surveys the communication status between ISDN 502 and the communication terminal unit 503 according to the messages of the frame on the signal channel which are output from the first protocol reception processor 104 and the second protocol reception processor 105. Further, it outputs an instruction to the information channel processor 107 to control the recording of the communication content on the information channel.

In response to the instruction from the protocol controller 106, the information channel processor 107 converts the data on the information channel received by the terminal-side receiver 102 and the network-side receiver 103 to data whose format is conformable to the recording into the recording medium, and then transfers the data thus converted to a recorder (not shown).

Next, the operation of the communication content recording apparatus 101 of this embodiment will be described.

Prior to the description of the operation, the processing procedure from the line connection between the communication terminal units 503 until the line disconnection therebetween which is carried out through ISDN 502 will be first described.

Figure 2:
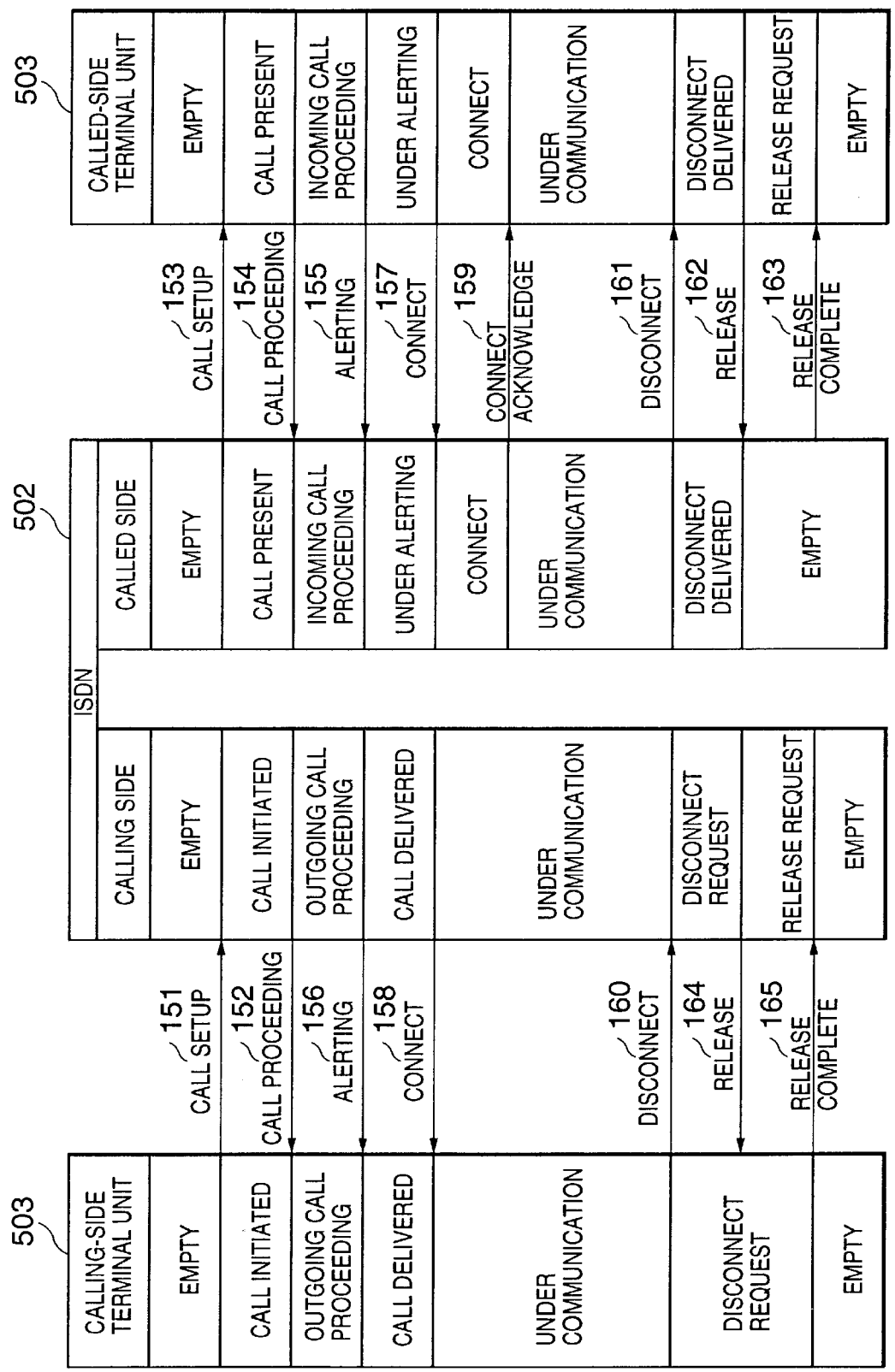
FIG. 2 is a diagram showing a processing procedure from a line connection until a line disconnection between communication terminal units 503 which is carried out through ISDN 502 in the communication system shown in FIG. 1.

FIG. 2 is a diagram showing a processing procedure from the line connection between the communication terminal units 503 until the line disconnection therebetween which is carried out through ISDN 502 in the communication system shown in FIG. 1. In the following description, a user's communication terminal unit 503 at a calling side is referred to as a calling-side terminal unit 503, and a user's communication terminal unit 503 at a called side is referred to as a called-side terminal unit 503.

As shown in FIG. 2, the calling-side terminal unit 503 first transmits a call-setup (SETUP) message 151 through the signal channel to ISDN 502. Upon receiving this message 151, ISDN 502 returns a call proceeding (CALL PROCEEDING) message 152 to the calling-side terminal unit 503 through the signal channel, and also transmits a call-setup message 153 to the called-side terminal unit 503.

The called-side terminal unit 503 which receives the call-setup message 153 transmits a call proceeding message 154 through the signal channel to ISDN 502, and also transmits an alerting (ALERTING) message 155 for notifying that it is now under alerting. Upon receiving this message, ISDN 502 transmits an alerting message 156 to the calling-side terminal unit 503 through the signal channel.

Next, the called-side terminal unit 503 responds to the alerting message to transmit a connect (CONNECT) message 157 to ISDN 502. Upon receiving this message, ISDN 502 transmits a connect message 158 through the signal channel to the calling-side terminal unit 503 and also transmits a connect acknowledge (CONNECT ACK) message 159 to the called-side terminal unit 503.

According to the above procedure, "call" is set up, and the communication using the information channel between the calling-side terminal unit 503 and the called-side terminal unit 503 can be performed.

In a case where the communication using the information channel between the calling-side terminal unit 503 and the called-side terminal unit 503 is completed, for example when the calling-side terminal unit 503 completes the communication using the information channel with the called-side terminal unit 503, the completion of the communication is performed according to the following procedure.

First, the calling-side terminal unit 503 transmits a disconnection (DISCONNECT) message 160 requesting disconnection through the signal channel to ISDN 502. Upon receiving this message, ISDN 502 transmits a disconnection message 161 through the signal channel to the called-side terminal unit 503.

The called-side terminal unit 503 which receives the disconnection message 161 transmits a release (RELEASE) message 162 requesting release through the signal channel to ISDN 502. Upon receiving this message, ISDN 502 transmits a release complete (RELEASE COMPLETE) message 163 to the called-side terminal unit 503 through the signal channel.

At the same time, ISDN 502 transmits a release message 164 through the signal channel to the calling-side terminal unit 503. Upon receiving this message, the calling-side terminal unit 503 transmits a release complete message 165 through the signal channel to ISDN 502.

Through the above procedure, the line is disconnected and the communication is completed.

The communication content recording apparatus 101 of this embodiment surveys the delivery of messages on the signal channel between the communication terminal unit 503 and ISDN 502 by using the protocol controller 106, and it controls the information channel processor 107 in accordance with the content of the messages to control the start/stop of the recording of the communication content on the information channel.

Figure 3:
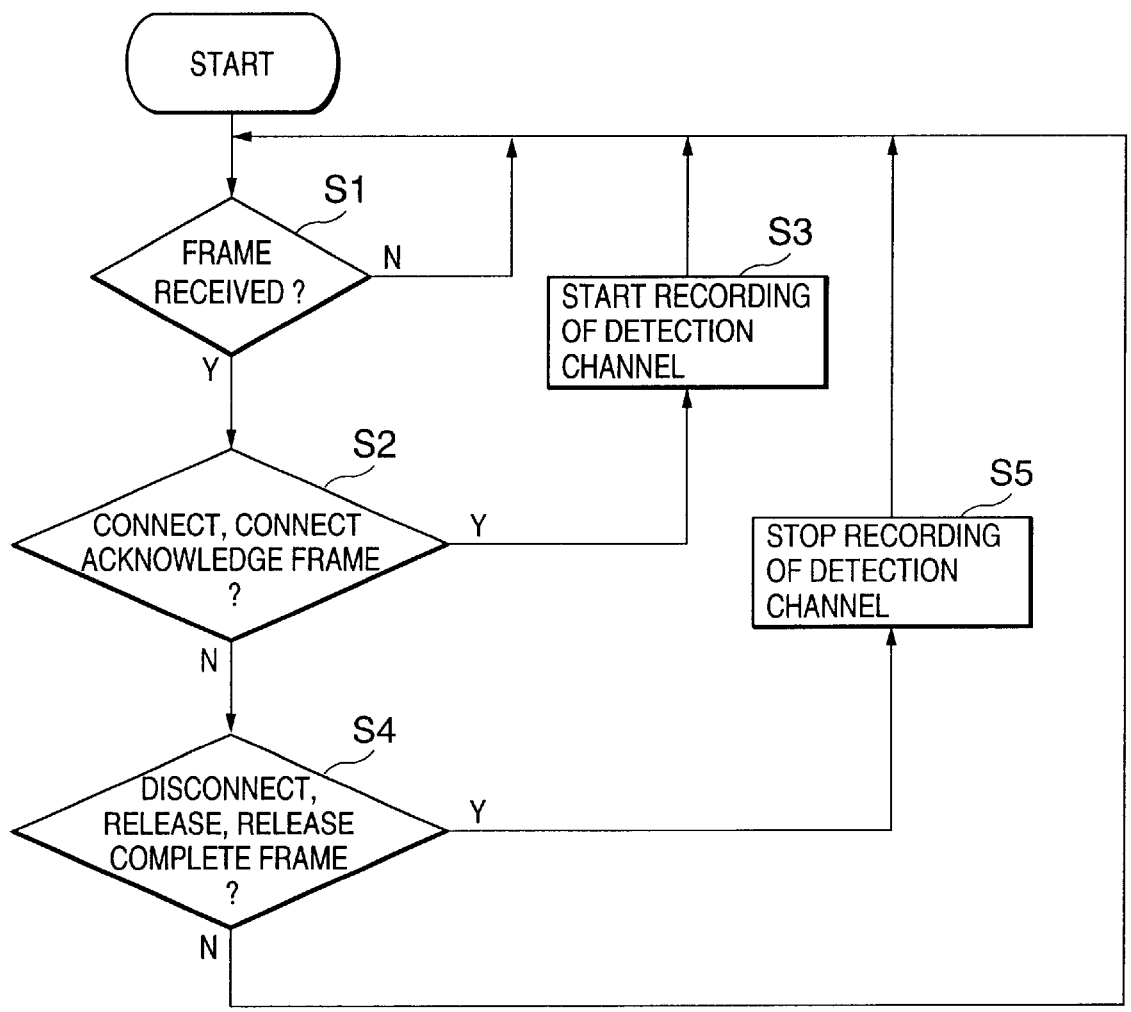
FIG. 3 is a flowchart showing the processing of the communication content recording apparatus 101 shown in FIG. 1.

FIG. 3 is a flowchart showing the processing of the communication content recording apparatus 101 according to the present embodiment.

The protocol controller 106 surveys, through the terminal-side receiver 102 and the first protocol reception processor 104 or through the network-side receiver 103 and the second protocol reception processor 105, whether or not a frame on the signal channel is received (step S1). If the frame on the signal channel is received, it is judged whether or not the frame concerned contains a connect message or a connect acknowledge message (step S2).

If it is judged in step S2 that the frame received contains a connect message or a connect acknowledge message, the processing goes to step S3 to output an instruction of starting the processing to the information channel processor 107. Upon receiving this instruction, the information channel processor 107 starts the processing for converting the data on the information channel received by the terminal-side receiver 102 and the network-side receiver 103 to data whose format is conformable to the recording in the recording medium, and then transferring the data thus converted into a recorder (not shown), whereby the recording of the communication content on the information channel is started. The protocol controller 106 returns to step Si after the recording of the communication content on the information channel is started in step S3, and is kept on standby until a next frame on the signal channel is received.

On the other hand, if it is judged in step S2 that the frame received does not contain a connect message or a connect acknowledge message, the processing goes to step S4 to judge whether the frame received contains a disconnect message, a release message or a release complete message.

If it is judged in step S4 that the frame received contains a disconnect message, a release message or a release complete message, the processing goes to step S5 to output an instruction of stopping the processing to the information channel processor 107. Upon receiving this instruction, the information channel processor 107 stops the processing of converting the data on the information channel received by the terminal-side receiver 102 and the network-side receiver 103 to the data whose format is compatible with being recorded into the recording medium, and then transferring the data thus converted into the recorder (not shown), whereby the recording of the communication content on the information channel is stopped. The protocol controller 106 returns to step Si after the recording of the communication content on the information channel is stopped in step S5, and is kept on standby until a next frame is received on the signal channel.

On the other hand, if it is judged in step S4 that the frame received does not contain a disconnect message, a release message or a release complete message, the protocol controller 106 returns to step Si to wait until a next frame is received on the signal channel.

According to the above-described first embodiment of the present invention, the start/stop of the recording of the communication content of the information channel is controlled on the basis of the messages on the signal channel which are transmitted/received between the communication terminal unit 503 and ISDN 502. Therefore, the communication content can be recorded without affecting the communication content and without changing the apparatuses constituting an existing communication system.

Next, a second embodiment according to the present invention will be described.

According to the communication content recording apparatus of the second embodiment, in a case where an error frame is received in the communication content recording apparatus of the first embodiment, if a next frame is not received within a predetermined time period after the error frame concerned is received, or if the content of a message contained in the next frame is not a re-transmission request, a message which would be originally contained in the error frame is presumed on the basis of a message contained in the frame received immediately before the error frame, whereby the start/stop of the recording of the communication content on the information channel can be accurately performed.

Figure 4:
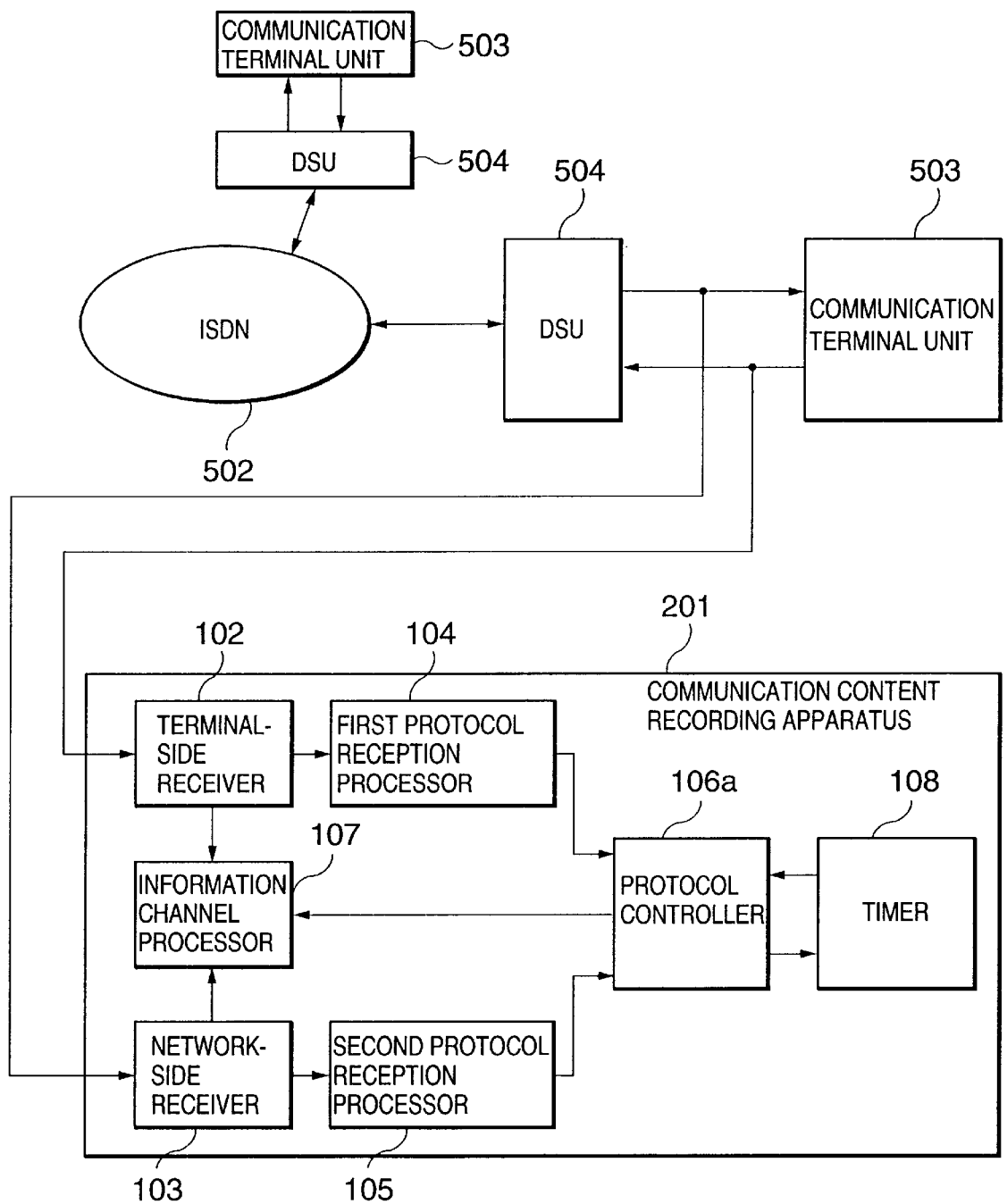
FIG. 4 is a schematic diagram showing a communication system to which a communication content recording apparatus 201 of a second embodiment of the present invention is applied.

FIG. 4 is a schematic diagram showing a communication system to which the communication content recording apparatus of the second embodiment of the present invention is applied. In FIG. 4, the communication terminal unit 503, DSU 504 and ISDN 502 are the same as those shown in FIG. 12, and the detailed description thereof is omitted from the following description.

The difference between the communication content recording apparatus 201 and the communication content recording apparatus 101 shown in FIG. 1 resides in that the protocol controller 106 is replaced with a protocol controller 106a and that a timer 108 is provided, and the other constituents are the same as the communication content recording apparatus 101. Therefore, the same numbers are affixed to the same constituents and the detailed description thereof is omitted.

The protocol controller 106a surveys the communication status between ISDN 502 and the communication terminal unit 503 according to the messages of a frame on the signal channel which are output from the first protocol reception processor 104 and the second protocol reception processor 105. Further, it outputs an instruction to the information channel processor 107 to control the recording of the communication content on the information channel. This is the same as the protocol controller 106 used in the communication content recording apparatus 101 of the first embodiment.

However, the protocol controller 106a used in the second embodiment executes the timer 108 to count the time until a next frame is received if the frame on the signal channel output from the first protocol reception processor 104 and the second protocol reception processor 105 is an error frame (the judgment of the error frame is performed by checking the frame check sequence portion of the LAPD frame in the first protocol reception processor 104 and the second protocol reception processor 105). If the next frame is not received within a predetermined time period after the error frame is received, error frame corrective processing as described later is performed, and a message which would be originally contained in the error frame is presumed on the basis of the frame received immediately before the error frame. Further, even when the next frame is received within the predetermined time period after the error frame is received, the same error frame corrective processing is carried out if a message contained in the next frame received is out of the re-transmission request, whereby the message which would be originally contained in the error frame is presumed on the basis of the frame received immediately before the error frame.

Next, the operation of the communication content recording apparatus 201 of this embodiment will be described.

Figure 5:
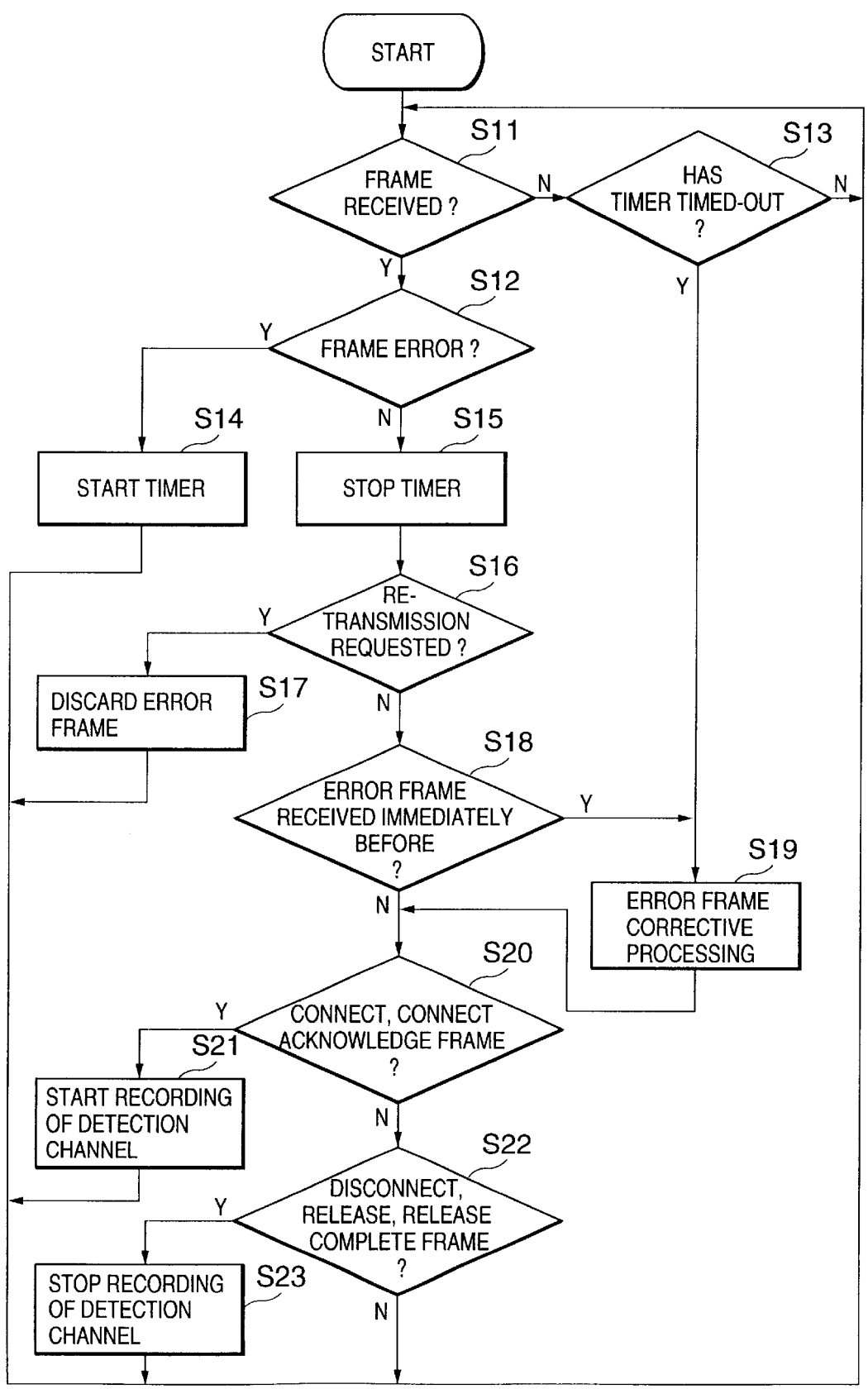
FIG. 5 is a flowchart showing the processing of the communication content recording apparatus 201 shown in FIG. 4.

FIG. 5 is a flowchart showing the processing of the communication content recording apparatus 201 of this embodiment.

The protocol controller 106a judges through the terminal-side receiver 102 and the first protocol reception processor 104 or through the network-side receiver 103 and the second protocol reception processor 105 whether or not a frame on the signal channel is received (step S11). If any frame is judged to be received on the signal channel, the processing goes to step S12, and if no frame is received on the signal channel, the processing goes to step S13.

In step S12, it is judged whether or not the frame received in step S11 is an error frame. If the frame is judged to be an error frame, the timer 108 is executed (step S14), and then the processing returns to step Sl1. On the other hand, if the frame is judged not to be an error frame, the timer 108 is stopped (if the timer is executed) (step S15), and the processing then goes to step S16.

In step S16, it is judged whether or not the frame received in step S11 is a re-transmission-request frame. If the frame is judged to be the re-transmission-request frame, it may be presumed that an error frame has occurred in the communication between the communication terminal unit 503 and ISDN 502 and therefore the communication terminal unit 503 at the error-frame reception side or ISDN 502 transmits a re-transmission request to the communication terminal unit 503 at the error frame transmission side or ISDN 502. In this case, in the communication content recording apparatus 201, if the error frame is received prior to reception of the re-transmission-request frame, the error frame concerned is discarded (step S17), and the processing then returns to step S11. On the other hand, if the frame received in step S11 is not the re-transmission-request frame, the processing goes to step S18.

In step S18, it is judged whether or not a frame received immediately before the processing target frame (the frame which is received through the step S11 executed immediately before), that is, the frame received through the step S11 which is executed immediately before the immediately-before executed step S11 is an error frame. If the frame concerned is not any error frame, the processing goes to step S20. On the other hand, if the frame concerned is an error frame, it may be presumed that the delivery of the messages on the signal channel between the communication terminal unit 503 and ISDN 502 is performed correctly, but the next frame is transmitted without transmitting any re-transmission request because the error frame occurs between the communication content recording device 201 and the communication terminal unit 503 or ISDN 502 for some reason. In this case, in accordance with the content of the message which would be originally contained in the error frame, there may occur a case where the recording of the communication content on the information channel cannot be performed correctly. Therefore, the processing goes to step S19 to perform the error frame corrective processing to presume the message which would be originally contained in the error frame. The error frame corrective processing will be described later.

In step 13, when the timer 108 is executed, it is judged whether or not the timer 108 concerned is timed-out. When the timer 108 is not executed, or when the timer 108 is executed, but it is not time-out, the processing goes to step S11. On the other hand, when the timer 108 is timed-out, it may be presumed that an error frame occurs between the communication content recording apparatus 201 and the communication terminal unit 503 or between the communication content recording apparatus 201 and ISDN 502 for some reason, and a next frame is not received within a predetermined time period (this time period is preferably set in consideration of the minimum value of communication time of a single frame) after the error frame is received because the communication on the information channel has been already executed correctly or completed between the communication terminal units 503 although the timer 108 is started in step S14. In this case, with respect to the special content of the message which would be originally contained in the error frame, there may occur a case where the recording of the communication content on the information channel cannot be performed correctly. Therefore, as in the case of the step S18, the processing goes to step S19 to perform the error frame corrective processing to presume the message which would be originally contained in the error frame.

In step S20, it is judged that whether or not the processing target frame contains a connect message or a connect acknowledge message. If it contains the connect message or the connect acknowledge message, the processing goes to step S21 to output an instruction to start the processing to the information channel processor 107. Upon receiving the instruction, the information channel processor 107 starts the processing of converting the data on the information channel received by the terminal-side receiver 102 and the network-side receiver 103 to data whose format is compatible with being recorded into the recording medium, and then transferring the data thus converted to the recorder (not shown), whereby the recording of the communication content on the information channel is started. The processing returns to step S11 after the recording of the communication content on the information channel is started in the step S21. On the other hand, if the processing target frame does not contain any one of the connect message and the connect acknowledge message, the processing goes to step S22.

In step S22, it is judged whether or not the processing target frame contains a disconnect message, a release message or a release complete message. If the frame contains the disconnect message, the release message or the release complete message, the processing goes to step S23 to output an instruction to stop the processing of the information channel processor 107. Upon receiving this instruction, the information channel processor 107 stops the processing of converting the data on the information channel received by the terminal-side receiver 102 and the network-side receiver 103 to data whose format is compatible with being recorded into the recording medium, and then transferring the data thus converted to the recorder (not shown), whereby the recording of the communication content on the information channel is stopped. The processing returns to the step S11 after the recording of the communication content on the information channel is stopped in the step S23. On the other hand, if the processing target frame does not contain any one of the disconnect message, the release message and the release complete message, the processing immediately returns to step S11.

Next, the error frame corrective processing which is executed in step S19 of FIG. 5 will be described. According to this processing, a message which would be originally contained in the error frame is presumed on the basis of a message contained in a frame received immediately before the error frame according to the call control procedure stored in the information portion of the LAPD frame.

Figure 6:
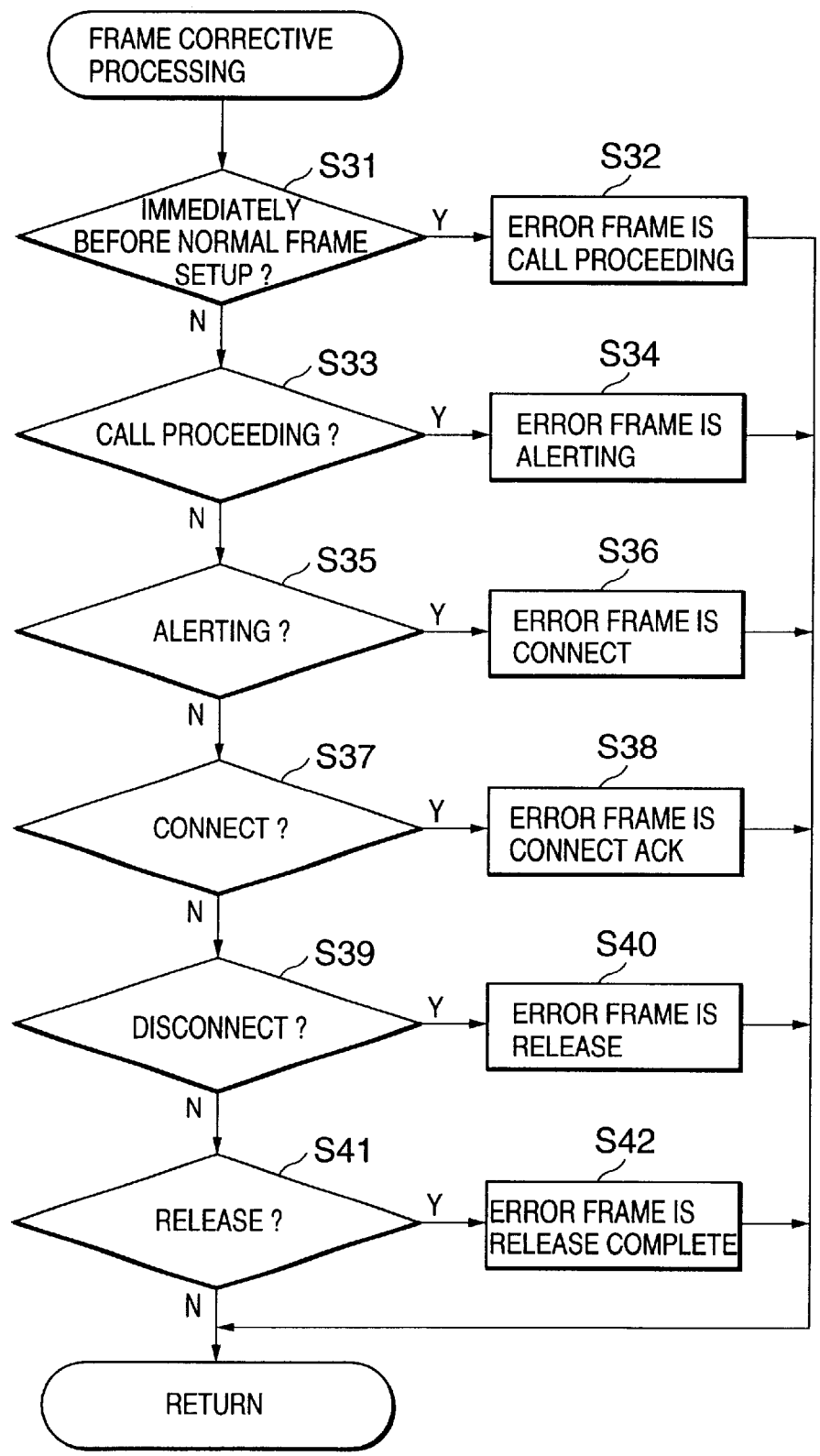
FIG. 6 is a flowchart showing error frame normalizing processing of step S19 in FIG. 5.

FIG. 6 is a flowchart showing the error frame corrective processing of step S19 shown in FIG. 5.

The protocol controller 106a judges whether or not the frame received immediately before the error frame contains a call setup message (step S31). When the frame contains the call setup message, the error frame is presumed to contain a call proceeding message (step S32), and the processing is finished. On the other hand, if the frame contains no call setup message, the processing goes to step S33.

In step S33, it is judged whether or not the frame received immediately before the error frame contains a call proceeding message. If the frame contains the call proceeding message, the error frame is presumed to contain an alerting message (step S34), and the processing is finished. If the frame contains no call proceeding message, the processing goes to step S35.

In step S35, it is judged whether or not the frame received immediately before the error frame contains an alerting message. If the frame contains an alerting message, the error frame is presumed to contain a connect message (step S36), and the processing is finished. If the frame contains no alerting message, the processing goes to step S37.

In step S37, it is judged whether or not the frame received immediately before the error frame contains a connect message. If the frame contains a connect message, the error frame is presumed to contain a connect acknowledge message (step S38), and the processing is finished. On the other hand, if the frame contains no connect message, the processing goes to step S39.

In step S39, it is judged whether or not the frame received immediately before the error frame contains a disconnect message. If the frame contains a disconnect message, the error frame is presumed to contain a release message (step S40), and the processing is finished. On the other hand, if the frame contains no disconnect message, the processing goes to step S41.

In step S41, it is judged whether or not the frame received immediately before the error frame contains a release message. If the frame contains a release message, the error frame is presumed to contain a release complete message (step S42), and the processing is finished. On the other hand, if the frame contains no release message, the error frame is presumed to contain no message with regard to the call establishment and call release, and the processing is finished.

When the presumption based on the error frame corrective processing shown in FIG. 6 for the message which would be originally contained in the error frame is completed, the processing goes to step S20 shown in FIG. 5, and the start/stop of the recording of the communication content on the information channel is controlled in accordance with the content of the presumed message.

According to the second embodiment of the present invention, when an error frame occurs for some reason although correct communication is performed between the communication terminal unit 503 and ISDN 502, the content of the error frame concerned is presumed on the basis of a message contained in a frame which is received immediately before the error frame. Accordingly, even when the error frame originally contains a message concerning call establishment and call release, the start and stop operation of the recording of the communication data can be performed correctly.

Next, a third embodiment according to the present invention will be described.

The communication content recording apparatus of the third embodiment aims to more accurately control the start/stop of the recording of the communication content on the information channel even when an error is detected in a frame on the signal channel as in the case of the above-described communication content recording apparatus of the second embodiment. However, in addition to the effect of the second embodiment, the third embodiment has an effect of more accurately controlling the start/stop of the recording of the communication content on the information channel even when a defective occurs in a frame on the signal channel. Therefore, the construction and operation of the third embodiment are different from those of the communication content recording apparatus of the second embodiment.

Figure 7:
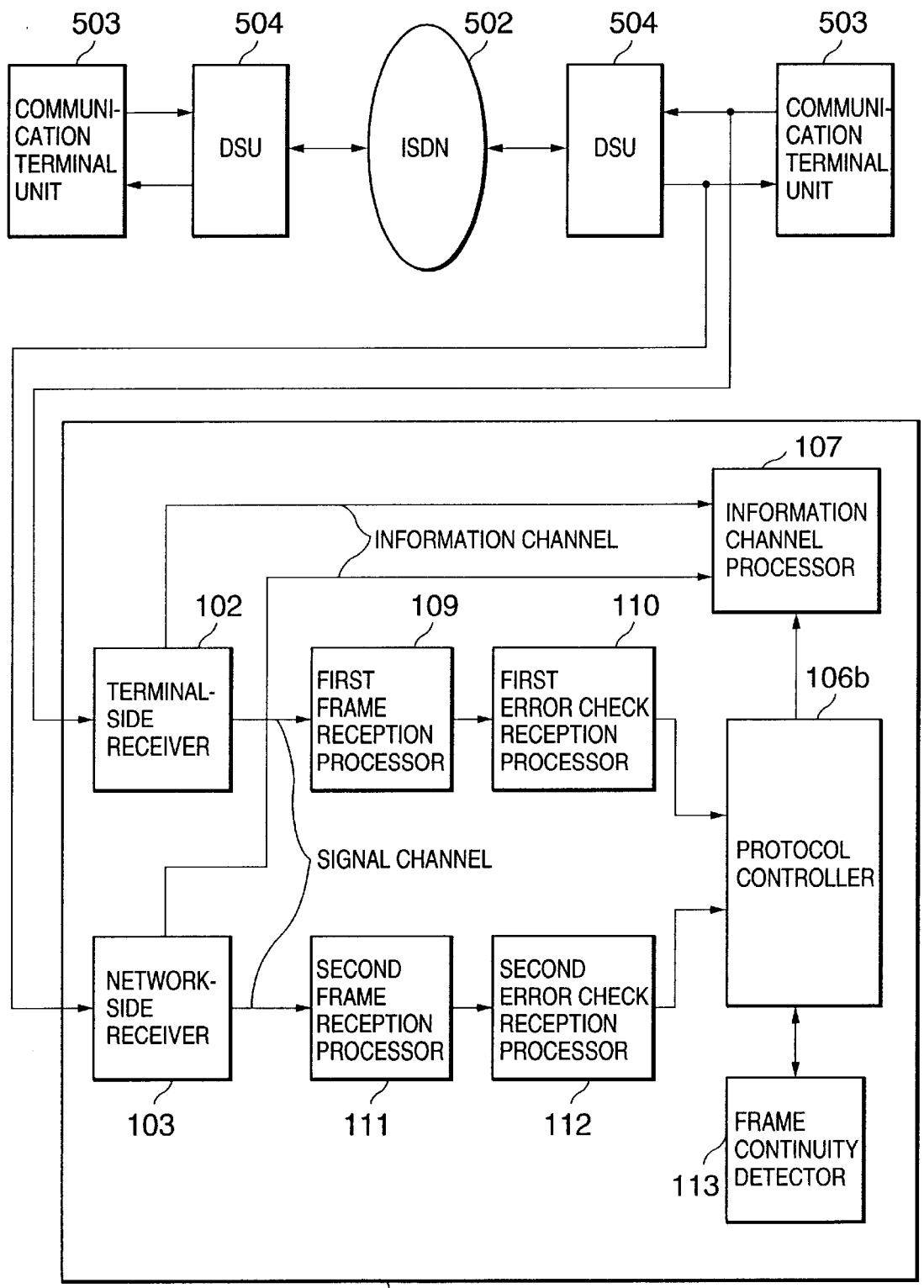
FIG. 7 is a schematic diagram showing a communication system to which a communication content recording apparatus 301 of a third embodiment of the present invention is applied.

FIG. 7 is a schematic diagram showing a communication system to which a communication content recording apparatus of the third embodiment of the present invention is applied. In FIG. 7, the communication terminal unit 503, DSU 504 and ISDN 502 are the same as those shown in FIG. 12, and the detailed description thereof is omitted.

The difference between the communication content recording apparatus 301 and the communication content recording apparatus 101 shown in FIG. 1 resides in the fact that the protocol controller 106 is replaced with a protocol controller 106b, the first protocol reception processor 104 is replaced with a first frame reception processor 109 and a first error check reception processor 110, the second protocol reception processor 105 is replaced with a second frame reception processor 111 and a second error check reception processor 112, and a frame continuity detector 113 is further provided. The other constituent elements are the same as those of the communication content recording apparatus 101 of the first embodiment. These constituent elements are represented by the same reference numerals, and the detailed description is omitted from the following description.

Figure 11:
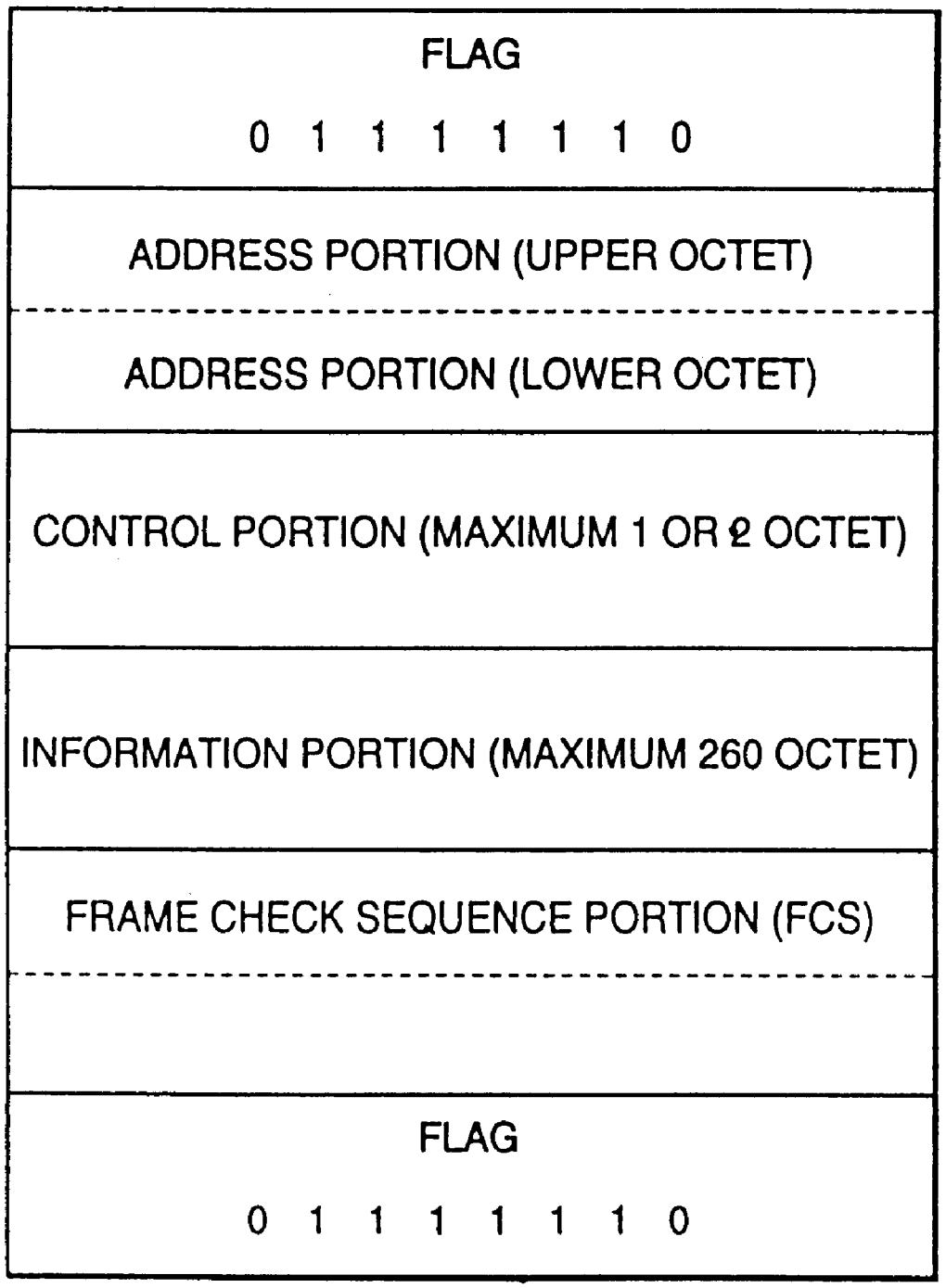
FIG. 11 is a diagram showing the structure of LAPD frame in ISDN.
Figure 13:
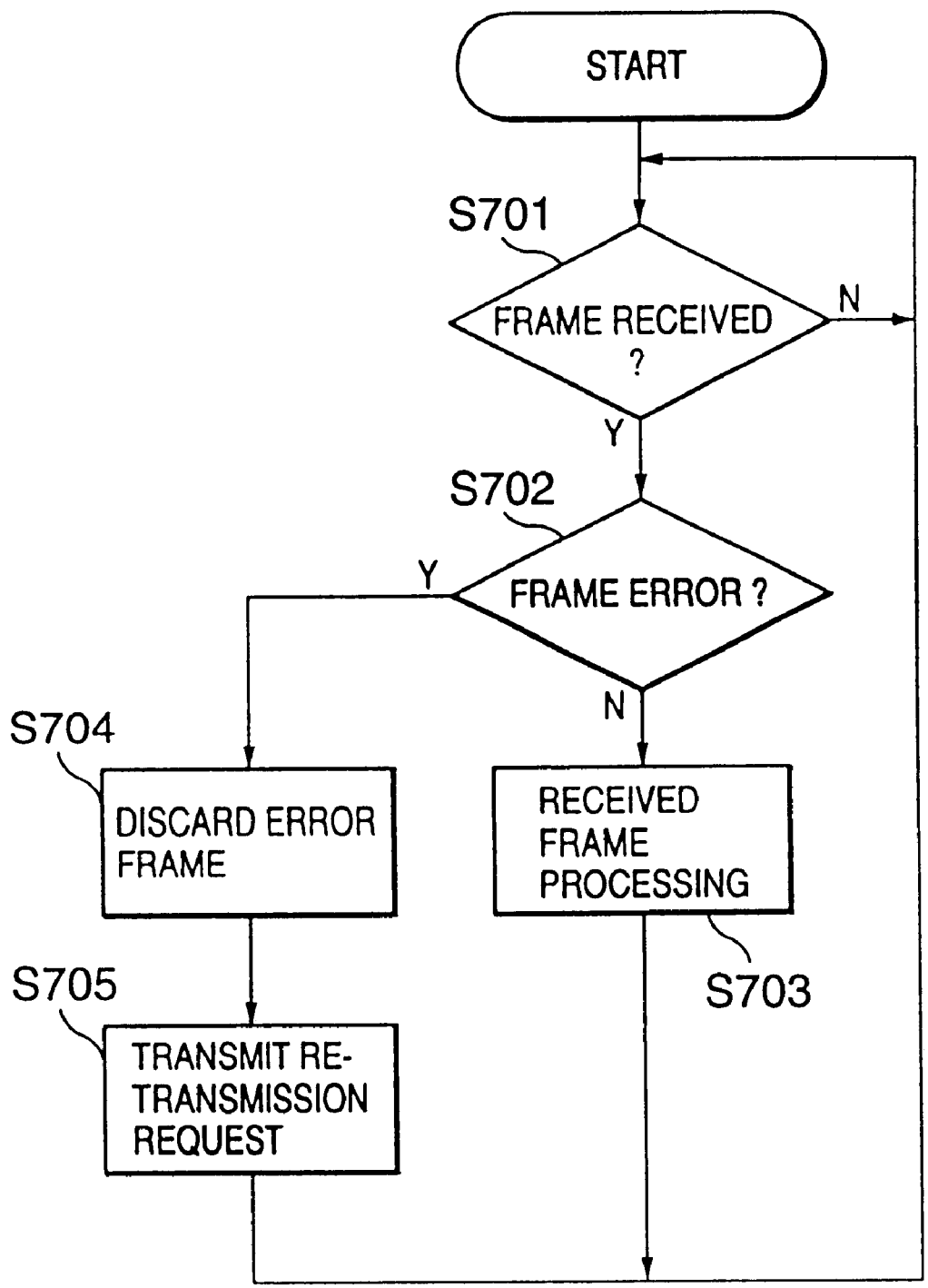
FIG. 13 is a flowchart showing the processing when a communication terminal unit receives an error frame in the conventional communication system shown in FIG. 12.

The first frame reception processor 109 extracts an LAPD frame as shown in FIG. 11 by detecting a flag from data on the signal channel which are received by the terminal-side receiver 102, and outputs the LAPD frame thus extracted to the first error check reception processor 110.

The second frame reception processor 111 extracts an LAPD frame as shown in FIG. 11 by detecting a flag from data on the signal channel which are received by the network-side receiver 103, and outputs the LAPD frame thus extracted to the second error check reception processor 112.

The first error check reception processor 110 detects a frame error on the basis of a frame check sequence portion which is added to the LAPD frame received from the first frame reception processor 109. The first error check reception processor 110 discards the LAPD frame (error frame) thus received if a frame error is detected, and delivers the LAPD frame thus received to the protocol controller 106b if no frame error is detected.

The second error check reception processor 112 detects a frame error on the basis of a frame check sequence portion which is added to the LAPD frame received from the second frame reception processor 111. It discards the LAPD frame (error frame) thus received if a frame error is detected, and delivers the LAPD frame thus received to the protocol controller 106b if no frame error is detected.

The frame continuity detector 113 detects frame missing by using a transmission sequence number, a reception sequence number added to the LAPD frame output to the protocol controller 106b from each of the first error check reception processor 110 and the second error check reception processor 112, thereby checking continuity of frames.

The protocol controller 106b extracts a message from the LAPD frame received from the first error check reception processor 110 and the second error check reception processor 112 on the basis of a frame format, a frame type and the information transmission procedure, and surveys the communication status between ISDN 502 and the communication terminal unit 503 according to the extracted message to control the information channel processor 107, thereby controlling the recording of the communication content on the information channel.

When a frame output from the first error check reception processor 110 or the second error check reception processor 112 is missed in the frame continuity detector 113 (for example, a frame is discarded because a frame error occurs in the first error check reception processor 110 or the second error check reception processor 112, or the terminal-side receiver 102 or the network-side receiver 103 cannot receive a frame because the frame itself is missing), the protocol controller 106b controls the information channel processor 107 on the basis of a judgment as to whether "call" of the information channel is established or released, thereby controlling the recording of the communication content on the information channel.

Next, the operation of the communication content recording apparatus 301 of the present embodiment will be described.

Before the operation of the communication content recording apparatus 301 is described, the processing procedure from the establishment of the link of the layer 2 between the communication terminal unit 503 and ISDN 502 through the establishment and release of "call" of the layer 3 until the release of the link of the layer 2, which is partially overlapped with the description made with reference to FIG. 2, will be described.

Figure 8:
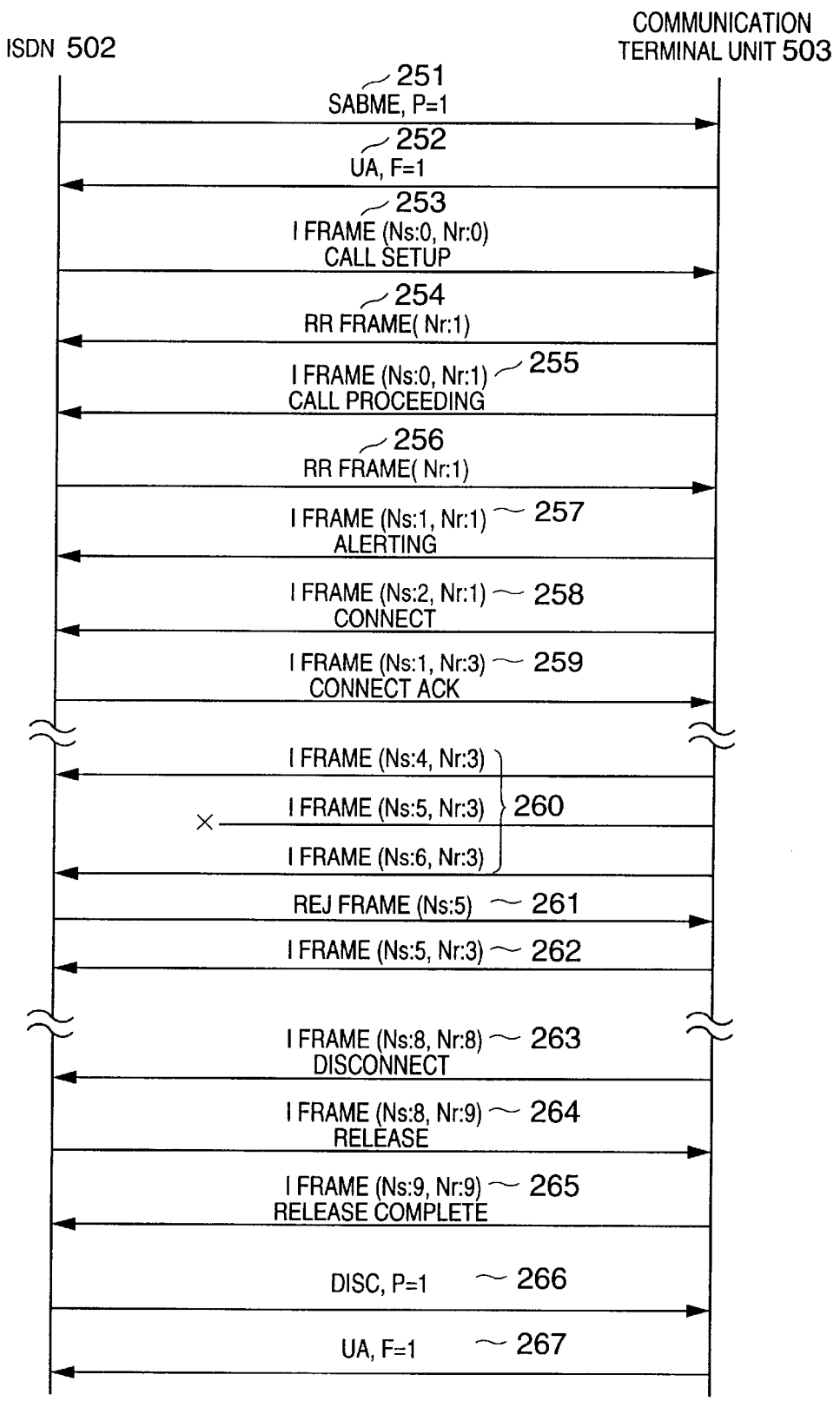
FIG. 8 is a diagram showing a processing procedure from establishment of the link of layer 2 between ISDN 502 and a communication terminal unit 503 through call establishment and call release of layer 3 until release of layer 2 link in the communication system shown in FIG. 7.

FIG. 8 is a diagram showing a processing procedure from the establishment of the link of the layer 2 between ISDN 502 and the communication terminal unit 503 through the establishment and release of "call" of the layer 3 until the release of the link of the layer 2 in the communication system shown in FIG. 7.

As shown in FIG. 8, when a set asynchronous balanced mode extended (SABME) frame 251 is transmitted from ISDN 502 through the signal channel to the communication terminal unit 503, upon receiving this frame 251, the communication terminal unit 503 transmits an unnumbered acknowledge (UA) frame 252 through the signal channel to ISDN 502, whereby the link of the layer 2 on the signal channel is established and the information transmission is enabled.

Subsequently, when a call-setup (SETUP) message 253 is transmitted from ISDN 502 to the communication terminal unit 503 through the signal channel, the communication terminal unit 503 notifies ISDN 502 of the reception of the information frame or the like through the signal channel with an information frame or a receive-ready (RR) frame 254, and transmits a call proceeding message 255. In the case of FIG. 8, ISDN 502 is notified with a receive-ready (RR) frame 254. Upon receiving the RR frame, the fact that an information frame or the like is received is notified from ISDN 502 to the communication terminal unit 503 with the information frame or the RR frame 256.

As described above, the RR frame is used to notify the communication partner of the number of frames received (a transmission sequence number of a frame to be received). The RR frame is generated every time a frame affixed with a sequence number is received from the communication partner, and notified to the communication partner. However, in the case of FIG. 8, only the RR frames which are first notified from the communication terminal unit 503 and ISDN 502 are shown in order to simplify the description.

Subsequently, the communication terminal unit 503 transmits to ISDN 502 through the signal channel an alerting (ALERTING) message 257 which notifies that it is now under alerting for information channel connection. The communication partner receives the call proceeding message 255 through ISDN 502, whereby the information channel is established between the communication terminal units 503. Upon responding the altering message, the communication terminal unit 503 transmits a connect (CONNECT) message 258 to ISDN 502 through the signal channel.

Subsequently, when a connect acknowledge (CONNECT ACK) message 259 is transmitted from ISDN 502 through the signal channel to the communication terminal unit 503, the "call" of the information channel set is established, and the communication using the information channel between ISDN 502 and the communication terminal unit 503 is enabled.

When a transmission error occurs in the information frame containing the message instructing such call control as described above, for example, when the information frames 260 having the transmission sequence numbers "4", "5" and "6" are transmitted from the communication terminal unit 503 to ISDN 502, however, the information frame having the transmission sequence number "5" is not normally transmitted to ISDN 502 due to transmission error, ISDN 502 detects the information frame which could not be normally received, on the basis of the transmission sequence number "5" of the information frame transmitted from the communication terminal unit 503, and transmits to the communication terminal unit 503 a frame 261 of a re-transmission request (REJ) which requests the re-transmission of the information frame. Upon receiving the REJ frame 261, the communication terminal unit 503 transmits to ISDN 502 the information frame having the transmission sequence number requested.

Next, when the communication using the information channel is stopped, the communication terminal unit 503 transmits to ISDN 502 a disconnect message 263 requesting release of "call" of the information channel. Upon receiving this disconnect message 263, ISDN 502 stops the communication using the information channel, and also transmits a release message 264 for releasing the information channel through the signal channel to the communication terminal unit 503. Upon receiving the release message 264, the communication terminal unit 503 transmits a release complete message 265 through the signal channel to ISDN 502, whereby the "call" of the information channel is released on the layer 3.

When no "call" exists, ISDN 502 transmits a disconnect frame 266 through the signal channel to the communication terminal unit 503. Upon receiving this frame 266, the communication terminal unit 503 transmits an unnumbered acknowledgement frame 267 through the signal channel to ISDN 502, thereby releasing the link of the layer 2 on the signal channel.

The communication content recording apparatus 301 of the present embodiment monitors transmission/reception of messages through the signal channel between the communication terminal unit 503 and ISDN 502 by using the protocol controller 106*b*, and controls the start/stop of the recording of the communication content on the information channel by controlling the information channel processor 107 in accordance with the content of the message.

For example, in the case of FIG. 8, the call-setup message 253 which is transmitted from ISDN 502 to the communication terminal unit 503 when the "call" of the information channel is established, is received to analyze the content thereof. In a case where the message 253 contains information representing that it is a speech communication, the information channel processor 107 is controlled so that the recording of the data on the corresponding information channel is started when the connect message 258 transmitted from the communication terminal unit 503 to ISDN 502 or the connect acknowledge message 259 transmitted from the communication terminal unit 503 to ISDN 502 is received.

Further, when the disconnect message 263 transmitted from communication terminal unit 503 to ISDN 502, the release message 264 transmitted from ISDN 502 to the communication terminal unit 503 or the release complete message 265 transmitted from the communication terminal unit 503 to ISDN 502 is received, the recording of the data on the corresponding information channel is stopped.

When the communication content recording apparatus 301 of the present embodiment receives an error frame on the signal channel, the following cases may be considered. One case is that the frame itself which is communicated between ISDN 502 and the communication terminal unit 503 is an error frame and thus the error frame is also received in the communication content recording apparatus 301, and the other case is that an error occurs only in the frame received by the communication content recording apparatus 301 for some reason such as a connection environment or the like although the frame reception/ transmission is performed correctly between ISDN 502 and the communication terminal unit 503. Further, when an error occurs in the flag for detecting a frame, the frame itself is missed.

As described above, the communication content recording apparatus 301 is designed to have no transmission function to ISDN 502 and the communication terminal unit 503 so that the communication between ISDN 502 and the communication terminal unit 503 is not affected by the communication content recording apparatus 301. Accordingly, even when an error frame is received or lack of a frame is detected, the communication content recording apparatus 301 cannot make a re-transmission request. Therefore, when only the frame input to the communication content recording apparatus 301 is an error frame or the lack of a frame is detected, there may be a case where the normal recording control cannot be performed if these frames contain messages associated with the start or stop of the recording.

Therefore, in the communication content recording apparatus 301 of the present embodiment, error frames and the lack of frames are detected by monitoring the continuity of frames, and when they are detected, the establishment or release of "call" of the information channel is monitored, whereby the recording control of the information channel can be performed correctly.

Figure 9:
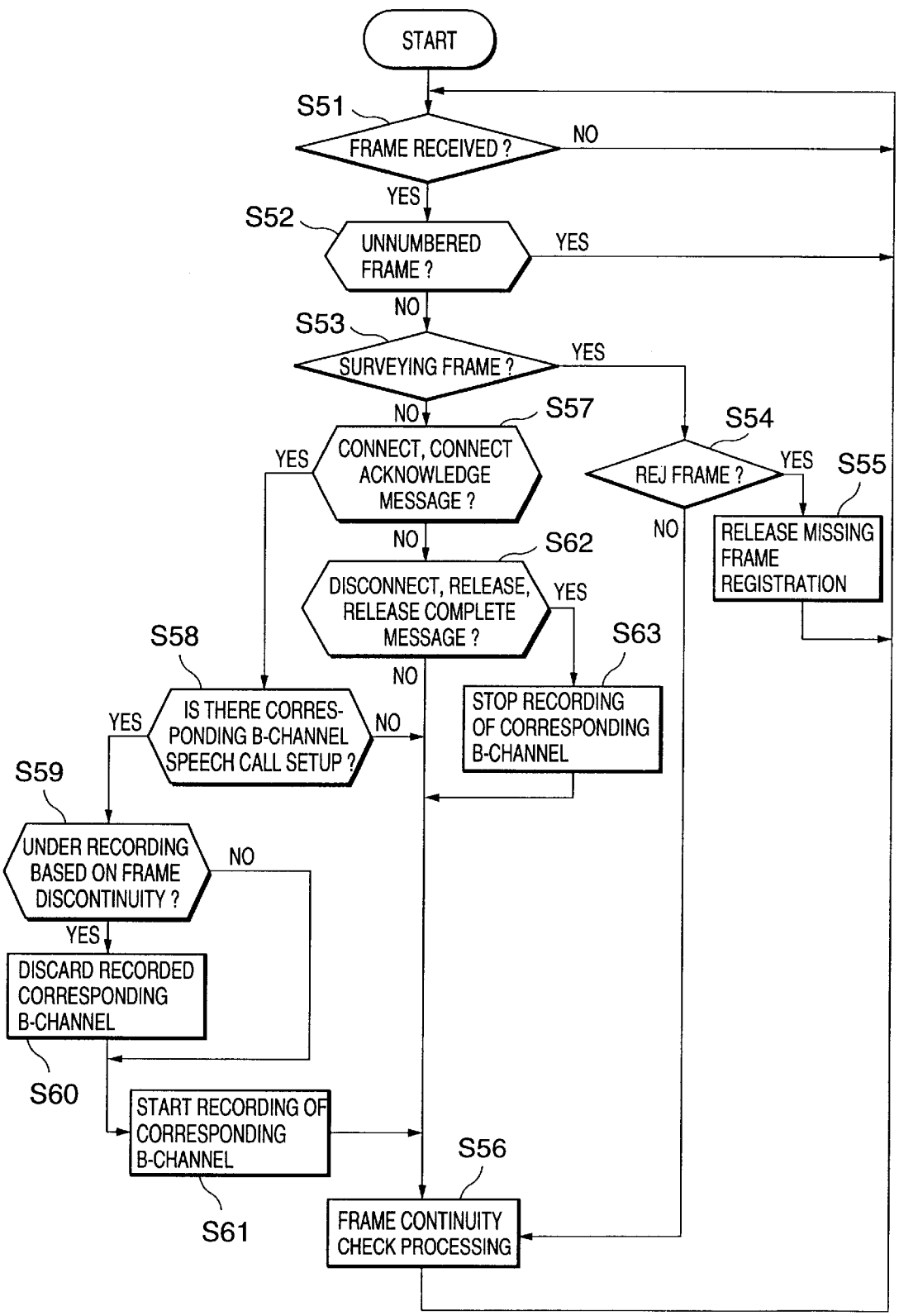
FIG. 9 is a flowchart showing the processing of the communication content recording apparatus 301 shown in FIG. 7.

FIG. 9 is a flowchart showing the processing of the communication content recording apparatus 301 of the present embodiment. This flow is executed for each of the frame output from the first error check reception processor 110 and the frames output from the second error check reception processor 112. That is, the flow shown in FIG. 9 is independently and separately executed for each of the frame transmission on the signal channel from the communication terminal unit 503 to ISDN 502 and the frame transmission from ISDN 502 to the communication terminal unit 503. The following description is given of a case where the flow shown in FIG. 9 is executed on the frame output from the first error check reception processor 110.

The protocol controller 106b is on standby to receive a frame on the signal channel which is transmitted from the communication terminal unit 503 through the first error check reception processor 110 to ISDN 502 (step S51). When a frame is received, the processing goes to step S52 to judge whether or not the frame thus received is an unnumbered frame to which no sequence number is affixed. If the frame is an unnumbered frame, the processing returns to step S51 and waits to receive a next frame. On the other hand, if the frame is not an unnumbered frame, that is, the frame is a frame affixed with a sequence number, the processing goes to step S53.

In step S53, it is judged whether or not the received frame is a surveying frame. As described above, the surveying frame is a frame for checking the establishment of the link of the layer 2 between ISDN 502 and the communication terminal unit 503. As surveying frames, there are provided a receive-ready (RR) frame for notifying a communication partner of the number of received frames (the transmission sequence number of a frame to be next received), a re-transmission request (REJ) frame for requesting re-transmission of a missing frame whose sequence number is missed when the sequence number of a received frame is not sequential to the sequence number of a frame received immediately before the frame concerned, etc.

If it is judged in step S53 that the received frame is a surveying frame, the processing goes to step S54 to judge whether or not the surveying frame is a re-transmission request frame. If the surveying frame is the re-transmission request frame, it is presumed that the communication terminal unit 503 transmits the re-transmission request frame because the frame communication on the signal channel cannot be performed correctly between ISDN 502 and the communication terminal unit 503 and thus an error frame occurs.

In this case, in accordance with the reception sequence number of the re-transmission request frame, the missing frame having the corresponding transmission sequence number registered in the processing of step S56 (frame continuity check processing) of the flow of FIG. 9 which is executed for the frame output from the second error check reception processor 112 is released(step S55). Thereafter, the processing returns to step S51, and waits to receive a next frame.

On the other hand, if the frame is not a re-transmission request frame, the processing goes to step S56 to check the continuity of the sequence number of the frame (which is transmitted from the communication terminal unit 503) which is received through the first error check reception processor 110, and if there is any missing frame, the frame continuity check processing which is the processing of controlling the start and stop of the recording of the information channel is performed by surveying the establishment or release of "call" of the information channel. Thereafter, the processing returns to step S51 to wait for reception of a next frame. The frame continuity check processing will be described later.

If it is judged in step S53 that the frame is not a surveying frame, that is, the frame received from the first error check reception processor 110 is neither an unnumbered frame, nor a surveying frame, this frame is presumed to be an information frame containing a message of the layer 3. In this case, the processing goes to step S57 to control the recording based on the layer 3.

First, it is judged whether the received frame contains a connect message or a connect acknowledge message (step S57). If the frame contains a connect message or a connect acknowledge message, the processing goes to step S58 to judge whether or not a speech call setup is made in the corresponding information channel. If the speech call setup is not made, the processing goes to step S56 to perform the frame continuity check processing. This operation is carried out to exclude the recording operation when call setup other than the speech call setup is made. On the other hand, if the speech call setup is made, it is judged whether or not the recording of the corresponding information channel has already been started by the frame continuity check processing (step S59). If the recording has been already started, the recording operation is stopped, and also the information recorded through this recording operation is discarded (step S60). Thereafter, the processing goes to step S61 to start the recording operation of the corresponding information channel. If the recording of the corresponding information channel is not started, the processing immediately goes to step S61 to start the recording of the corresponding information channel.

Further, if it is judged in step S57 that the received frame contains no connect message or no connect acknowledge message, the processing goes to step S62 to judge whether or not the received frame contains a disconnect, release or release complete message (step S62). If the frame contains a disconnect, release or release complete message, the information channel processor 107 is controlled so that the recording of the corresponding information channel is stopped (step S63), and the processing goes to step S56 to perform the frame continuity check processing. On the other hand, if the frame does not contain any disconnect, release or release complete message, the processing immediately goes to step S56 to perform the frame continuity check processing.

Next, the frame continuity check processing which is executed in step S56 of FIG. 9 will be described.

Figure 10:
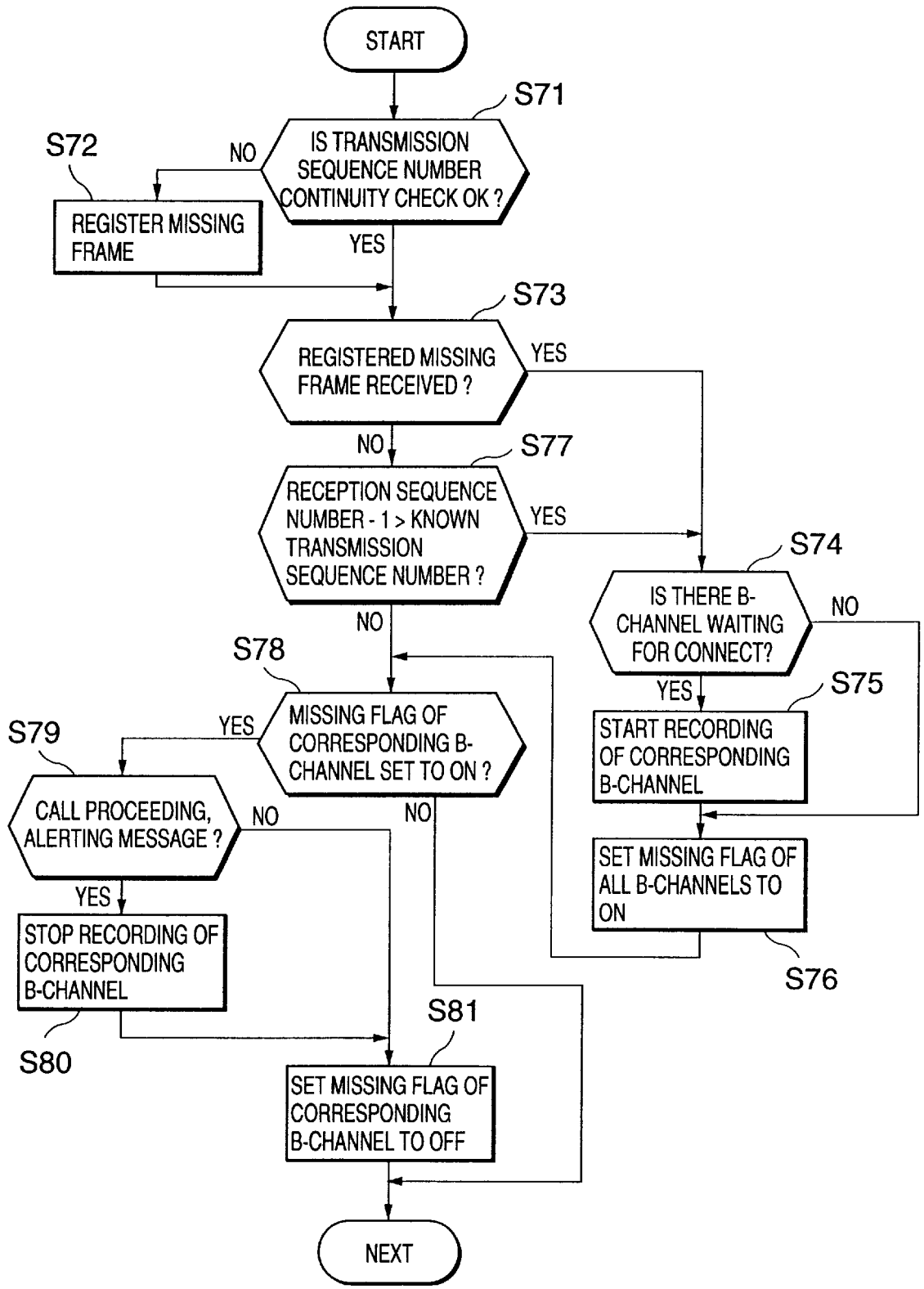
FIG. 10 is a flowchart showing frame continuity check processing of step S56 shown in FIG. 9.

FIG. 10 is a flowchart showing the frame continuity check processing of the step S56 shown in FIG. 9. The following description is made for a case where the frame continuity check processing is applied to the frame transmission from the communication terminal unit 503 to ISDN 502 on the signal channel.

First, a frame continuity detector 113 obtains a transmission sequence number of a frame which is received from the first error check reception processor 110 by the protocol controller 106b, and checks whether or not the number transmission sequence number is sequential to the transmission sequence number of the frame received immediately before the frame concerned (step S71). If the transmission sequence number of the frame concerned is sequential to that of the immediately-before received frame, the processing goes to step S73. On the other hand, if the transmission sequence number of the frame concerned is not sequential to that of the immediately-before received frame, the processing goes to step S72 to register the transmission sequence number of the missing frame. For example, when the transmission sequence number of the received frame is "4" and the transmission sequence number of the immediately-before frame is "2", the frame of the transmission sequence number "3" is registered as a missing frame. Thereafter, the processing goes to step S73.

As described above, when the frame received through the second error check reception processor 112 (the frame transmitted from ISDN 502) is identified as a re-transmission request frame in the step S54 of the flow of FIG. 9 which is executed for the output from the second error check reception processor 112, the registration of the missing frame having the transmission sequence number corresponding to the reception sequence number of the re-transmission request frame is released by the step S55 of the flow of FIG. 9.

In step S73, the protocol controller 106b waits to receive a new frame (a frame transmitted from ISDN 502) through the second error check reception processor 112. If the protocol controller 106b receives a new frame, by referring to the reception sequence number of the frame concerned, it is judged whether ISDN 502 has already received from the communication terminal unit 503 the frame having the transmission sequence number which is registered as a missing frame. If the ISDN 502 has already received from the communication terminal unit 503 the frame having the transmission sequence number which is registered as a missing frame, it is presumed that only the communication content recording apparatus 301 cannot normally receive the frame concerned for some reason.

In this case, the processing goes to step S74 to judge whether there is an information channel which is on standby for "connect", that is, an information channel for which the call proceeding is completed. If there is any information channel which is on standby for "connect", it may be presumed that only the communication content recording apparatus 301 cannot correctly receive it and the frame which is registered as a missing frame may contain a connect message or a call proceeding message.

In this case, the processing goes to step S75 to control the information channel processor 107 so that the recording of the corresponding information channel is started. Thereafter, the processing goes to step S76 to set a flag representing that frame missing occurs in all the information channels. On the other hand, if there is no information channel which is on standby for "connect", the processing immediately goes to step S76 to set a flag representing that frame missing occurs in all the information channels.

If the judgment that ISDN 502 does not receive from the communication terminal unit 503 the frame having the transmission sequence number which is registered as a missing frame is made on the basis of the reception sequence number of the frame which is newly received through the second error check reception processor 112 by the protocol controller 106b, the processing goes to step S77 to judge whether or not the value obtained by subtracting "1" from the newly received reception sequence number is larger than the maximum value of the transmission sequence numbers of the frames which have been received through the first error check reception processor 110 by the protocol controller 106b (the frames transmitted from the communication terminal unit 503).

Each of the reception and transmission sequence numbers is modulo (mod) 128 in which the numerical values from "0" to "127" are repeated. Therefore, the above judgment (comparison) is performed in consideration of the repeat frequency of the numeral values (the frequency of reset to zero).

If the value obtained by subtracting "1" from the reception sequence number of the frame (transmitted from ISDN 502) which is newly received through the second error check reception processor 112 by the protocol controller 106b is larger than the maximum value of the transmission sequence numbers of the frames (transmitted from the communication terminal unit 503) which have been received through the first error check reception processor 110 by the protocol controller 106b, it is resumed that frame missing occurs between ISDN 502 and the communication terminal unit 503 for some reason. In this case, the processing of the steps S74 to S76 is carried out as in the case of step S73, and the recording of the communication content on the information channel is started if necessary.

In step S78, it is judged whether or not the frame received through the first error check reception processor 110 is an information frame for the information channel in which a missing flag is set to ON. If the frame is not the information frame for the information channel in which the missing flag is set to ON, the flow is completed.

On the other hand, if the frame is the information frame for the information channel in which the missing flag is set to ON, the processing goes to step S79 to judge whether or not the frame contains a call proceeding message or an alerting message. If the frame contains the call proceeding message or the alerting message, the information channel processor 107 is controlled so that when the recording of the corresponding information channel has already been started, the recording is stopped (step S80), the missing flag of the information channel is then set to OFF (step S81), and this flow is then completed. If it is judged in step S79 that the frame contains no call proceeding message or no alerting message, the missing flag of the information channel concerned is immediately set to OFF (step S81), and this flow is completed.

According to the above-described third embodiment, the continuity of frames is surveyed by the sequence numbers affixed to the LAPD frames communicated on the signal channel, and if a frame missing occurs, it is surveyed whether the re-transmission procedure defined by the protocol between the communication terminal unit 503 and ISDN 502 is adopted.

If a surveying frame or an information frame is transmitted from the transmission destination (reception side) of the missing frame without using the re-transmission procedure based on the transmission of a re-transmission request frame, and a sequence number representing that the normal reception procedure is continued is affixed to this frame, it is judged that an error occurs in only the communication content recording apparatus 301, and the call proceeding based on voice communication is completed to start the recording of the information channel which waits for "connect".

With the above operation, even when a frame containing a connect or connect acknowledge message is partially or wholly missing, the recording operation of the communication content of the information channel can be controlled. Therefore, the lack of the communication content can be prevented.

In the present embodiment, the recording operation is stopped when an information frame containing a call proceeding message, an alerting message, a disconnect message, a release message or a release complete message with regard to the information channel under recording is received. With this operation, wasteful recording can be prevented.

In the present embodiment, even when a frame containing a disconnect message, a release message or a release complete message cannot be received, the control of the recording of the telephonic communication is performed on the basis of reception of a frame containing a next call proceeding message or alerting message, whereby the recording can be controlled on the basis of breaks in the telephonic communication.

Further, in the present embodiment, when an error is detected by the frame check sequence of the LAPD frame, the error frame is discarded by the first error check reception processor 110 and the second error check reception processor 112 without delivering the error frame to the protocol controller 106c, whereby the same processing procedure is applied to treat the missing of frames and error frames with no discrimination in the frame continuity check processing of the step S56 in FIG. 9.

In the present embodiment, when the information frame for controlling the information channel concerned is received on the signal channel for the information channel for which the recording is started by the frame continuity check processing of the step S56 shown in FIG. 9, the recording operation is controlled in accordance with the information frame concerned. Particularly when the information frame concerned contains a connect message or a connect acknowledge message, it is notified to the information channel processor 107 that data which are previously recorded are invalid, thereby discarding the data which have been recorded and re-starting the recording from the time when the information frame concerned is received. With this operation, the invalid data can be more reliably prevented from being recorded.

The present invention is not limited to the above embodiments, and various modifications may be made without departing from the subject matter of the present invention.

For example, in the above-described embodiments, the information on a pair of channels (signal channel and information channel) between two communication terminal units 503 is monitored to record communication contents. However, a modification may be made so that even when plural pairs of signal and information channels exist, the respective information on these channels is individually surveyed to record the communication contents.

Further, in the above-described embodiments, the information channel processor 107 is designed to convert the data on the information channel in such a data format that the data thus converted can be recorded in a recording medium, and then output the data thus converted. However, the present invention is not limited to this embodiment. The information channel processor 107 may be designed so that it can convert the data on the information channel and record the data thus converted into the recording medium by itself.

Still further, the respective constituent elements which constitute the communication content recording apparatus of each embodiment may be implemented not only by hardware, but also by software. For example, in an information processing device such as a personal computer having a reception function, each of the constituent elements constituting the communication content recording apparatus of each embodiment may be implemented by executing a program in which each constituent element is formed as a process. The program may be stored in a storage medium such as FD, CD-ROM or the like from which information can be read out by the information processing device.

As described above, according to the present invention, there can be provided a communication content recording apparatus which is suitable for digital communications such as ISDN, etc.

What is claimed is:

1. A communication content recording apparatus for recording the contents of communications which are carried out through a digital communication network between communication terminal units, comprising:

receiving means for receiving data on a signal channel and data on an information channel which are received/transmitted between said digital communication network and said communication terminal units;

protocol processing means for extracting a frame from the data on the signal channel received by said receiving means according to a protocol and processing the frame extracted;

information channel processing means for processing the data on the information channel received by said receiving means so that the processed data can be recorded; and protocol controlling means for controlling the start and stop of the processing in said information channel processing means on the basis of a processing result in said protocol processing means.

2. The communication content recording apparatus as claimed in claim 1, wherein said protocol controlling means starts the processing of said information channel processing means when the processing result of said protocol processing means indicates that the extracted frame contains any one of a connect message and a connect acknowledge message.

3. The communication content recording apparatus as claimed in claim 1, wherein the processing of said information channel processing means is stopped when the processing result of said protocol processing means indicates that the extracted frame contains any one of a disconnect message, a release message and a release complete message.

4. The communication content recording apparatus as claimed in claim 1, wherein in a case where the processing result of said protocol processing means indicates an error frame, if said reception means does not receive a next frame within a predetermined time period after receiving the error frame, said protocol controlling means presumes content of the error frame on the basis of the processing result of said protocol processing means for a frame received immediately before the error frame.

5. The communication content recording apparatus as claimed in claim 1, wherein in a case where the processing result of said protocol processing means indicates an error frame and the processing result of said protocol processing means for a frame received subsequent to the error frame is not a re-transmission request frame, said protocol controlling means presumes content of the error frame on the basis of the processing result of said protocol processing means for a frame received immediately before the error frame.

6. A communication content recording apparatus for recording contents of communications which are carried out through a digital communication network between communication terminal units, comprising:

receiving means for receiving data on a signal channel and data on an information channel which are received/transmitted between said digital communication network and said communication terminal units;

frame processing means for extracting a frame from the data on the signal channel received by said receiving means and outputting the frame thus extracted;

information channel processing means for processing the data on the information channel received by said receiving means so that the processed data can be recorded;

protocol controlling means for controlling start and stop of the processing of said information channel processing means according to a message contained in the frame output from said frame processing means; and frame missing detection means for surveying continuity of frames output from said frame processing means to detect a missing frame, wherein when a frame missing is detected by said frame missing detection means, in accordance with a progress status of establishment or release procedure of a call of an information channel, said protocol controlling means controls start and stop of the processing of said information channel processing means for the information channel.

7. The communication content recording apparatus as claimed in claim 6, wherein when the frame extracted from the data on the signal channel received by said receiving means is an error, said frame processing means discards the frame without delivering the frame to said protocol controlling means.

8. The communication content recording apparatus as claimed in claim 6, wherein when a frame missing is detected by said frame missing detection means, said protocol controlling means judges, on the basis of a subsequently-output frame from said frame processing means, whether or not a reception procedure is correctly continued between said digital communication network and said communication terminal unit, and controls start and stop of the processing of said information channel processing means corresponding to an information channel concerned in accordance with a progress status of establishment or release procedure of a call of the information channel when reception procedure is judged to be correctly continued.

9. The communication content recording apparatus as claimed in claim 6, wherein in a case where the processing of said information channel processing means for the information channel is started on the basis of the detection of the frame missing by said frame missing detection means, when said protocol controlling means receives a frame on the signal channel to control the information channel concerned from said frame processing means, said protocol controlling means controls the processing of said information channel processing means for the information channel concerned according to a message contained in the frame concerned.

10. The communication content recording apparatus as claimed in claim 6, wherein when a frame received from said frame processing means contains a connect message or a connect acknowledge message for an information channel after the processing of said information channel processing means for the information channel is started on the basis of the detection of the frame missing by said frame missing detection means, said protocol controlling means discards data generated through the processing of said information channel processing means for the information channel concerned, and newly starts the processing of said information channel processing means for the information channel concerned.

11. The communication content recording apparatus as claimed in claim 6, wherein in a case where said protocol controlling means receives a frame containing a call proceeding message or an alerting message from said frame processing means in a state where said protocol controlling means received no frame containing a disconnect message, a release message and a release complete message from said frame processing means, when the processing of said information channel processing means for the information channel corresponding to the message concerned is carried out, said protocol controlling means stops the processing.

12. The communication content recording apparatus as claimed in claim 6, wherein when said protocol controlling means receives a frame containing any one of a call proceeding message, an alerting message, a disconnect message, a release message and a release complete message for the information channel from said frame processing means in a state where the processing of said information channel processing means is started, said protocol controlling means stops the processing of said information channel processing means for the information channel concerned.

13. A communication content recording method for recording contents of communications which are carried out through a digital communication network between communication terminal units, comprising the steps of:

receiving data on a signal channel which are transmitted/received between said digital communication network and said communication terminal units;

extracting a frame from the received data on the signal channel according to a protocol, and processing the frame; and controlling start and stop of recording of the data on the information channel, which are transmitted/received between said communication terminal units in accordance with a processing result.

14. The communication content recording method as claimed in claim 13, wherein in a case where the processing result of the received frame indicates an error frame, further comprising the step of presuming content of the error frame on the basis of a processing result of a frame which is received immediately before the error frame when a next frame is not received within a predetermined time period after the error frame is received.

15. The communication content recording method as claimed in claim 13, wherein in a case where the processing result of the received frame indicates an error frame, further comprising the step of presuming content of the error frame on the basis of a processing result of a frame which is received immediately before the error frame when a processing result of a frame received subsequent to the error frame indicates that the error frame is not a re-transmission request frame.

16. A communication content recording method for recording contents of communications which are carried out through a digital communication network between communication terminal units, comprising the steps of:

extracting a frame from data on a signal channel which is transmitted/received between said digital communication network and said communication terminal unit;

controlling start and stop of recording of data on an information channel in accordance with a message contained in the frame concerned; and in a case where frame missing is detected on the basis of a sequence number of the extracted frame, controlling start and stop of processing for the information channel concerned in accordance with a progress status of establishment or release procedure of a call of the information channel.

17. A storage medium in which a program for recording contents of communications which are carried out through a digital communication network between communication terminal units are stored, wherein said program controls an information processing apparatus having a reception function to execute a function of receiving data on a signal channel and data on an information channel which are transmitted/received between said communication terminal units, a function of extracting a frame from the received data on the signal channel according to a protocol, and a function of controlling start and stop of recording of the received data on the information channel on the basis of a processing result of the extracted frame on the signal channel.

* * * * *